United States Patent [19]
Iijima et al.

[11] Patent Number: 5,481,355
[45] Date of Patent: Jan. 2, 1996

[54] FLYING SPHERICAL BODY MEASURING APPARATUS

[75] Inventors: Kenzaburou Iijima; Katsufumi Kondo; Katsuhiko Masuda; Kouji Yataka; Yasuyuki Chujo, all of Hamamatsu, Japan

[73] Assignee: Yamaha Corporation, Hamamatsu, Japan

[21] Appl. No.: 102,345

[22] Filed: Aug. 5, 1993

[30] Foreign Application Priority Data

Aug. 6, 1992 [JP] Japan .................................. 4-210504
Jan. 8, 1993 [JP] Japan .................................. 5-002127

[51] Int. Cl.⁶ .......................... G01P 3/36; G01B 11/12; A63B 69/36
[52] U.S. Cl. .................... 356/28; 356/152.3; 273/185 R; 250/222.1
[58] Field of Search ................... 250/222.1; 273/185 R; 356/28, 152.3

[56]  References Cited

U.S. PATENT DOCUMENTS

| | | | |
|---|---|---|---|
| 3,759,528 | 9/1973 | Christophers et al. | 273/185 R |
| 4,542,906 | 9/1985 | Takase et al. | 273/185 R |
| 5,226,660 | 7/1993 | Curchod | 273/185 B |

FOREIGN PATENT DOCUMENTS

| | | |
|---|---|---|
| 48-40514 | 6/1973 | Japan . |
| 49-111729 | 10/1974 | Japan . |
| 55-146046 | 11/1980 | Japan . |
| 56-43505 | 4/1981 | Japan . |
| 58-44387 | 10/1983 | Japan . |
| 60-21349 | 5/1985 | Japan . |
| 61-204514 | 9/1986 | Japan . |
| 2272310 | 11/1990 | Japan . |

OTHER PUBLICATIONS

Mitsubishi Electric Giho, GL–1000, vol. 58, No. 2, 1984.

*Primary Examiner*—Stephen C. Buczinski
*Attorney, Agent, or Firm*—Loeb and Loeb

[57]  ABSTRACT

The initial movement of a spherical body is detected by detecting the intersection with a light beam emitted from trigger light illuminating portion 2 to trigger light-receiving portion 3, and as a result, measurement of time by an arithmetic processing unit is started. During flight, spherical body 1 intersects light beams emitted from surface velocity sensors 4 and 5, the reflected light therein is detected by these surface velocity sensors 4 and 5, and the surface velocity of spherical body 1 is then measured. Spherical body 1 continues in flight and intersects at least two light beams irradiated from multi-beam illuminating portion 6 which are detected by multi-beam light-receiving portion 7. Based on a signal from multi-beam light-receiving portion 7 the arithmetic processing unit measures the time of intersection of spherical body 1 with a light beam, and then calculates the angle of elevation, horizontal angle, velocity and surface velocity of spherical body 1 based on the aforementioned measured time period. Furthermore, this arithmetic processing unit also calculates the amount of directional rotation of spherical body 1 based on the aforementioned calculated angle of elevation, horizontal angle, velocity and surface velocity of spherical body 1.

3 Claims, 12 Drawing Sheets

FLYING SPHERICAL BODY MEASURING APPARATUS

BACKGROUND OF THE INVENTION

Background of the Invention

The present invention relates to a flying spherical body measuring apparatus for measuring the flight velocity, flight direction and rotational amount around various axes of rotation such as during back spin, side spin and the like of a rotating, flying spherical body such as a golf ball when struck by a club. In addition, the present invention relates further to a flying spherical body measuring apparatus for measuring the angle of elevation, horizontal angle, and flight velocity of a flying spherical body possessing a high flight velocity.

Measuring devices, such as those described in the following, for measuring the initial angle, flight velocity and like of a golf ball struck by a club are known.

(1) Japanese Patent Application, First Publication Laid Open No. 48-40514 discloses an apparatus in which a semicircular super reflective strip is placed on a ball, after which light is irradiated at the flying ball from a lighting system. The light reflected by the aforementioned strip is then detected by a plurality of sensors. Using the results detected by these sensors, this apparatus then calculates the range, offset distance to the left or right side caused by pull or slice spins, difference between the ball height and the ideal height, and the like, which would result when the player actually played on a golf course.

(2) Japanese Patent Application, First Publication No. 55-146046 discloses an apparatus in which at least two reflective marks are affixed to the circumference of the golf ball spanning the back spin. These reflective marks are affixed at a predetermined angle θ° with regards to the center of the ball. After the ball is struck, when a reflective mark faces the light-projecting and light-receiving faces, the light from the light-projecting face is reflected by the reflective mark to the light-receiving face, and then transformed into an electric signal by the light-receiving device. In the case when two reflective marks are affixed to the ball, two electric signals are obtained per one revolution of the ball, and the electric signal thereby increases. The time interval is then measured, and the spin amount is calculated.

In addition, Japanese Patent Application, First Publication Laid Open No. 2-272310 discloses a turning angle measuring apparatus for measuring the rotating angle of a rotating body to which a detection mark has been affixed. The rotating angle is measured by means of photoelectrically or magnetically reading the aforementioned detection mark.

(3) An apparatus is also known which is equipped with a magnetic sensor for detecting the club head impact parameter just before its impact. At the time of the impact, the head velocity, face angle, blow direction, hitting area and the like of the club head are calculated based on the AC waveform obtained from the magnetic sensor. In addition, in order to detect the motion of the ball after impact, two types of ball detection portions are sequentially arranged along the flight direction of the ball. Each ball detection portion is constructed in a manner such that the flight line of the ball lies in between an infrared diode and a plurality of phototransistors which are arranged facing each other. In this type of construction, following impact, when the output light of the infrared diode is interrupted by the ball, a ball detection signal is obtained from the phototransistor which was supposed to receive this output light. In this manner, the initial flight direction (angle of horizontal deviation), angle of elevation, initial velocity and the like are calculated based on the detection signal obtained from each respective phototransistor of each ball detection portion. The detection signal generated by the phototransistor of each ball detection portion incorporates not only a component corresponding to the infrared diode inside the same ball detection portion, but also contains a component corresponding to the infrared diode inside the other ball detection portion. Consequently, in order to detect the position of the ball, it is necessary to divide these two components within the detection signal. Consequently, each infrared diode is driven by means of a two-phase pulse signal in which the phases are set off from each other by 180°. In addition, each of the two components incorporated into the detection signal of the phototransistor are sampled by means of two types of sampling pulses simultaneously generated with each pulse signal. By means of this ball detection signal, the position of the ball is detected, and the horizontal angle of the ball flight (angle of horizontal deviation), angle of elevation, initial velocity and the like are calculated from the results of this detection (see Mitsubishi Electric Giho, vol. 58: No 2, 1984).

(4) Japanese Patent Application, Second Publication No. 58-44387 discloses an apparatus in which two types of ball detection portions are sequentially arranged along the flight direction of the ball. Each ball detection portion is constructed in a manner such that the flight line of the ball lies in between a light source and a plurality of phototransistors which are arranged facing each other. Each light source utilizes a sealed box with a slit in the front face which houses an illuminating device and a means for converging the output light of this illuminating device. The output light of each light source is also designed to be received by the respective corresponding phototransistors. By means of this structure, the elapsed time and distance traveled for the ball as it passes through each ball detection portion is calculated based on the detection signal obtained from each phototransistor, and based on these calculations, the velocity of both the club and ball am measured.

Additionally, apparatuses for measuring the flight angle and velocity of a ball by optical detection of the ball are disclosed in Japanese Patent Application, First Publication Laid Open No. 49-111729, Japanese Patent Application, First Publication Laid Open No. 56-43505 and Japanese Patent Application, First Publication Laid Open No. 61-204514.

However, in the above-mentioned measuring apparatuses (1) and (2) above, only special balls provided with super reflective strips, detection marks and the like can be used, and thus there exist drawbacks in that it is necessary to confirm and align these marks for every stroke.

In addition, another problem arises in that all of the aforementioned measuring apparatuses have complex constructions. In particular, in the case of apparatus (3), disadvantages exist such as the requirement of two types of ball position detection means, the heavy influence of the construction accuracy on the measuring accuracy, employment of a large number of components, as well as, high costs. In addition, no consideration was given in regard to the shape of the flying body, i.e. that a ball is a spherical body, and thus the calculation accuracy is low. Furthermore, in apparatus (4), only the velocity of the club and ball can be measured, and in order to improve the measuring accuracy, it is necessary for the initial position of the ball and the sensor to be placed far apart resulting in an increase in size of the apparatus.

SUMMARY OF THE INVENTION

The present invention, taking into consideration the aforementioned, provides a flying spherical body measuring apparatus through which highly accurate results can be obtained wherein up-sizing does not occur, thus maintaining the integrity of a simple construction.

The flying spherical body measuring apparatus according to a first aspect of the present invention comprises:

a detecting means for detecting the a start of motion of a flying spherical body from a predetermined initial flight point;

a surface velocity sensor, arranged in a forward direction of said flying spherical body, with respect to said initial flight point, for optically measuring a surface velocity of said flying spherical body;

a multi-beam illuminating portion for emitting a plurality of light beams along a plane in a manner such that at least two of said plurality of light beams intersect said flying spherical body while in flight, said multi-beam illuminating portion being arranged in a forward direction of said flying spherical body with respect to said surface velocity sensor;

a multi-beam light receiving portion for receiving respectively a plurality of light beams emitted from said multi-beam illuminating portion; and an arithmetic processing means for timing periods from the start of motion of the spherical body to intersections of the spherical body with at least two of said plurality of light beams and for calculating amounts of rotation of said flying spherical body with respect to predetermined directions based on the surface velocity measured by said surface velocity sensor, and amounts of an angle of elevation, a horizontal angle and velocity of said flying spherical body based on said periods.

In the apparatus according to a first aspect of the present invention, the initial flight of the flying spherical body is detected by means of a initial flight detector, at which time the arithmetic processing unit begins measuring time. During flight, when the spherical body intersects a light beam emitted by the surface velocity sensor, the reflected light therein is detected by the surface velocity sensor, which then measures the surface velocity of the spherical body. The spherical body further continues its flight and intersects at least two light beams emitted from the multi-beam illuminating portion. These light beams are then detected by the multi-beam light-receiving portion. The arithmetic processing unit measures the period of intersection of the flying spherical body with each light beam, based on the signals supplied by the multi-beam light-receiving portion, and then calculates the angle of elevation, horizontal angle and velocity of the flying spherical body using the aforementioned measured time periods. The arithmetic processing unit then calculates the amount of directional rotation of the flying spherical body based on the calculated the angle of elevation, horizontal angle, velocity, and surface velocity of the flying spherical body.

In the aforementioned manner, in accordance with a first aspect of the present invention, the angle of elevation, horizontal angle, velocity, and the amount of directional rotation of the flying spherical body can be calculated with a high accuracy using a simple construction.

The measuring apparatus for measuring a flying body which flies from a predetermined initial flight point along a direction of motion according to a second aspect of the present invention comprises:

a detecting means for detecting the start of motion of the flying body from the predetermined initial flight point;

a laser light source arranged in a forward direction of said flying spherical body, with respect to said initial flight point, for irradiating a light beam of a fixed width in a direction perpendicular to the horizontal plane, said light beam obliquely crossing the direction of motion of the flying spherical body;

a laser light-receiving portion for continuously receiving said light beam irradiated by said laser light source, and for detecting the position of said flying spherical body through interruption of said light beam by said flying spherical body;

an arithmetic processing means for timing first and second periods from the start of motion of the body to a start of intersection of the body with said light beam and an end of intersection of the body with said light beam, respectively, and for calculating amounts of an angle of elevation, a horizontal angle and velocity of said flying body based on said first and second periods.

According to a second aspect of the present invention, the start of motion of the flying body is detected by means of a initial flight detector, at which time the arithmetic processing unit begins measuring time. During flight, when the body intersects a light beam irradiated in an inclined manner from the laser light source with regard to the linear path of the flying body, this light beam is detected by the laser light-receiving portion, resulting in detection of the position of the flying body. The arithmetic processing unit then measures the period of intersection of the flying body with the light beam based on a signal supplied by the laser light-receiving portion. The arithmetic processing unit subsequently calculates the angle of elevation, horizontal angle and velocity of the flying body using the aforementioned detected time period and position of the flying body.

In the aforementioned manner, in accordance with a second aspect of the present invention, the angle of elevation, horizontal angle and velocity of the flying body can be calculated at a high accuracy without requiring a large scale apparatus or complex construction.

The measuring apparatus for measuring a flying body which flies from a predetermined initial flight point along a direction of motion according to a third aspect of the present invention comprises:

a detecting means for detecting the start of motion of the flying body from the predetermined initial flight point;

a light source arranged in a forward direction of said flying spherical body, with respect to said initial flight point, for irradiating a light beam spreading over a predetermined width in a direction perpendicular to the horizontal plane, said light beam obliquely crossing the direction of motion of the flying spherical body;

a laser light-receiving portion for continuously receiving said light beam irradiated by said laser light source, and for detecting the position of said flying spherical body through interruption of said light beam by said flying spherical body;

an arithmetic processing means for generating a first information and a second information regarding the intersection of the flying body with said light beam, respectively, and for calculating amounts of an angle of elevation, a horizontal angle and velocity of said flying body based on said first and second information.

A BRIEF DESCRIPTION OF THE DRAWINGS

Figure 11A:
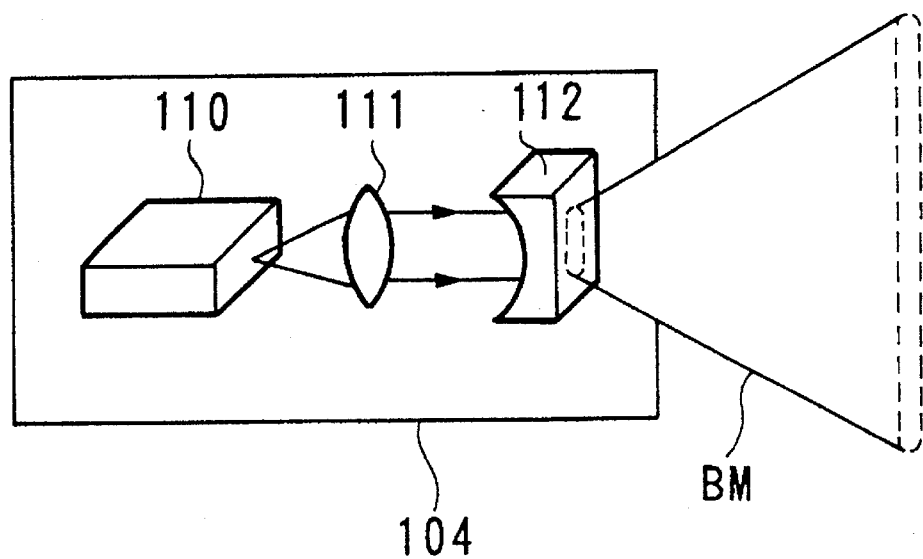

FIGS. 11(a) and (b) show a construction of a laser light source according to a second embodiment of the present invention.

Figure 12:
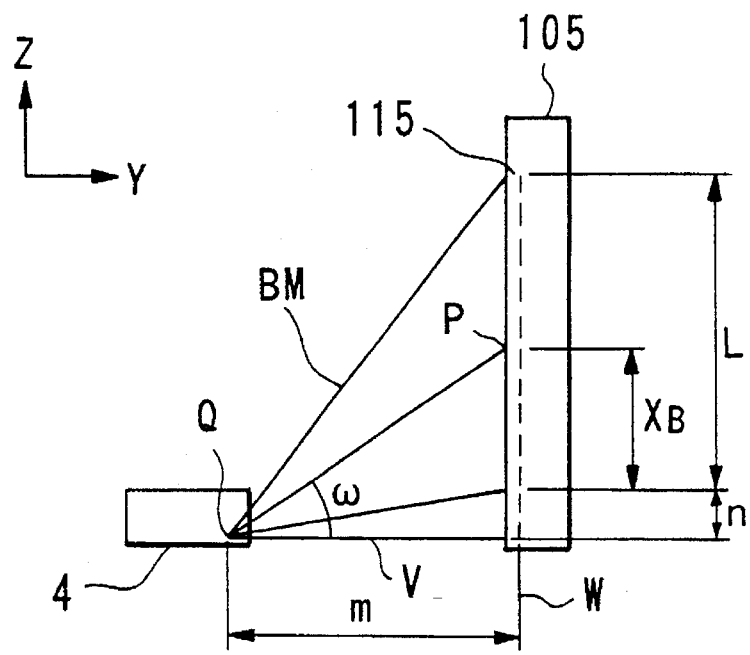

FIG. 12 shows a constructional example of a laser light-receiving portion according to a second embodiment of the present invention.

Figure 13:
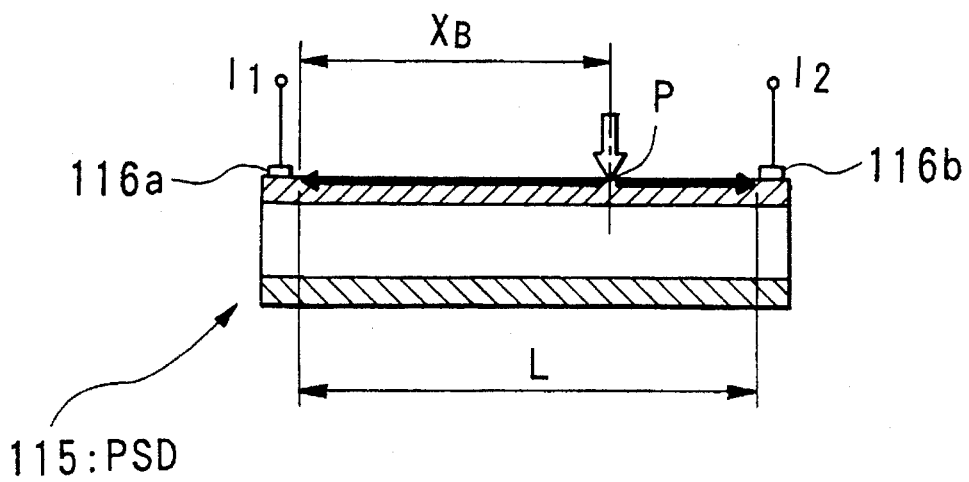

FIG. 13 shows a PSD construction used as a laser light-receiving portion according to a second embodiment of the present invention.

Figure 14:
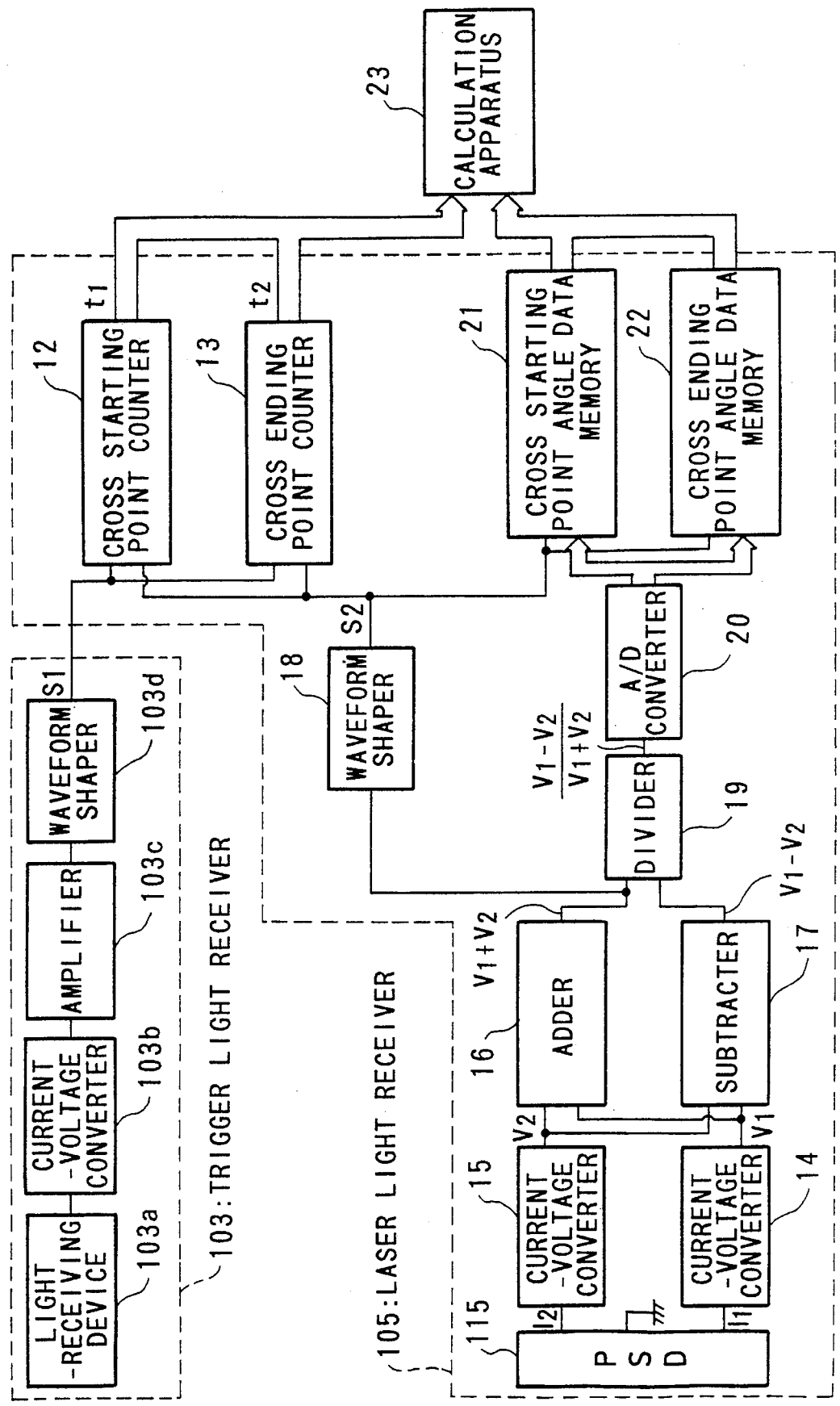

FIG. 14 shows a circuit construction according to a second embodiment of the present invention.

Figure 15:
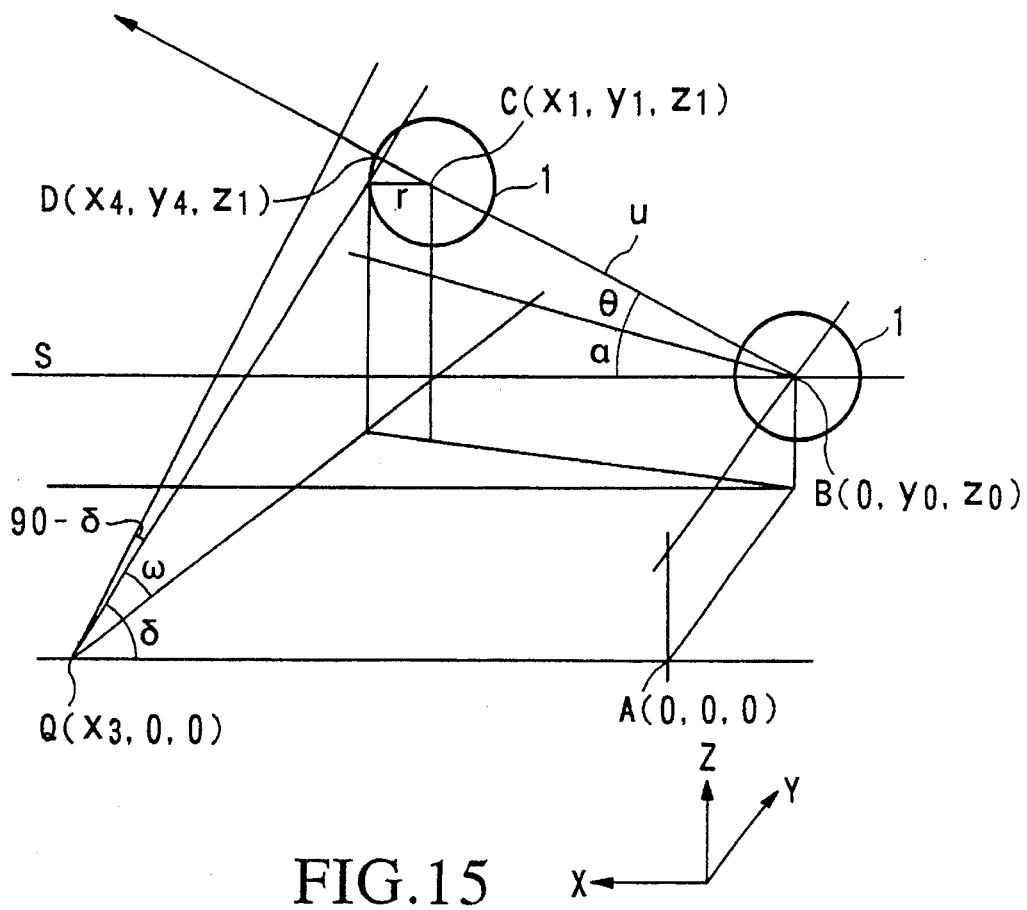

FIG. 15 shows the actions of a flying spherical body measuring apparatus according to a second embodiment of the present invention.

Figure 16:
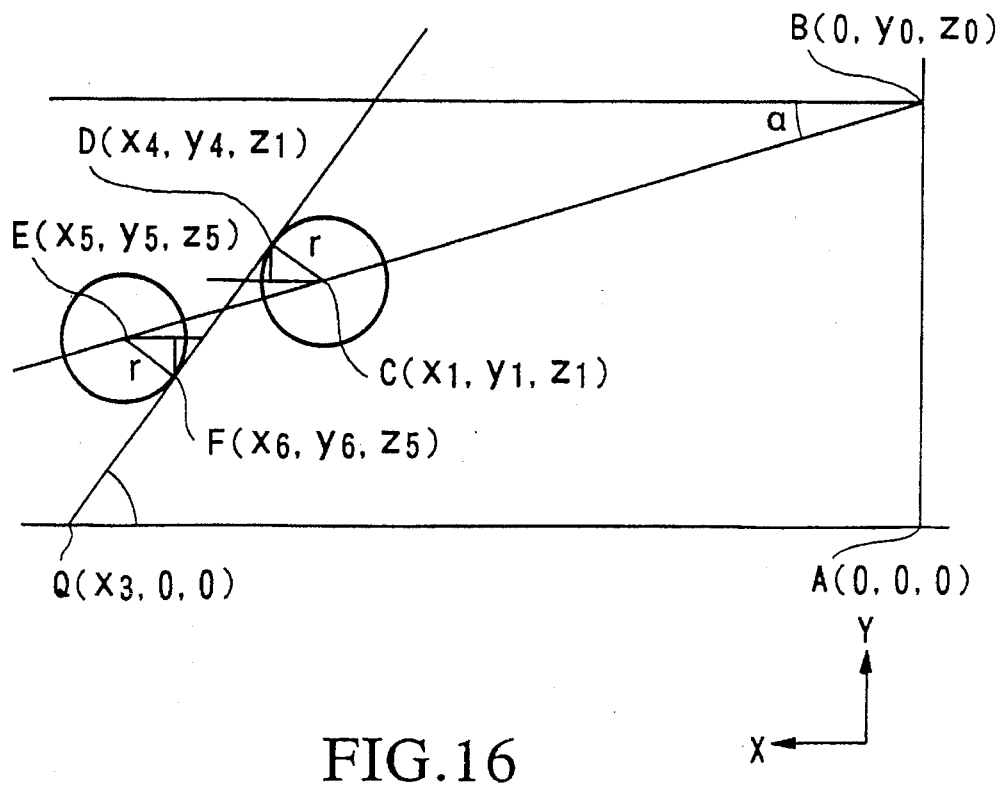

FIG. 16 shows the actions of a flying spherical body measuring apparatus according to a second embodiment of the present invention.

Figure 17:
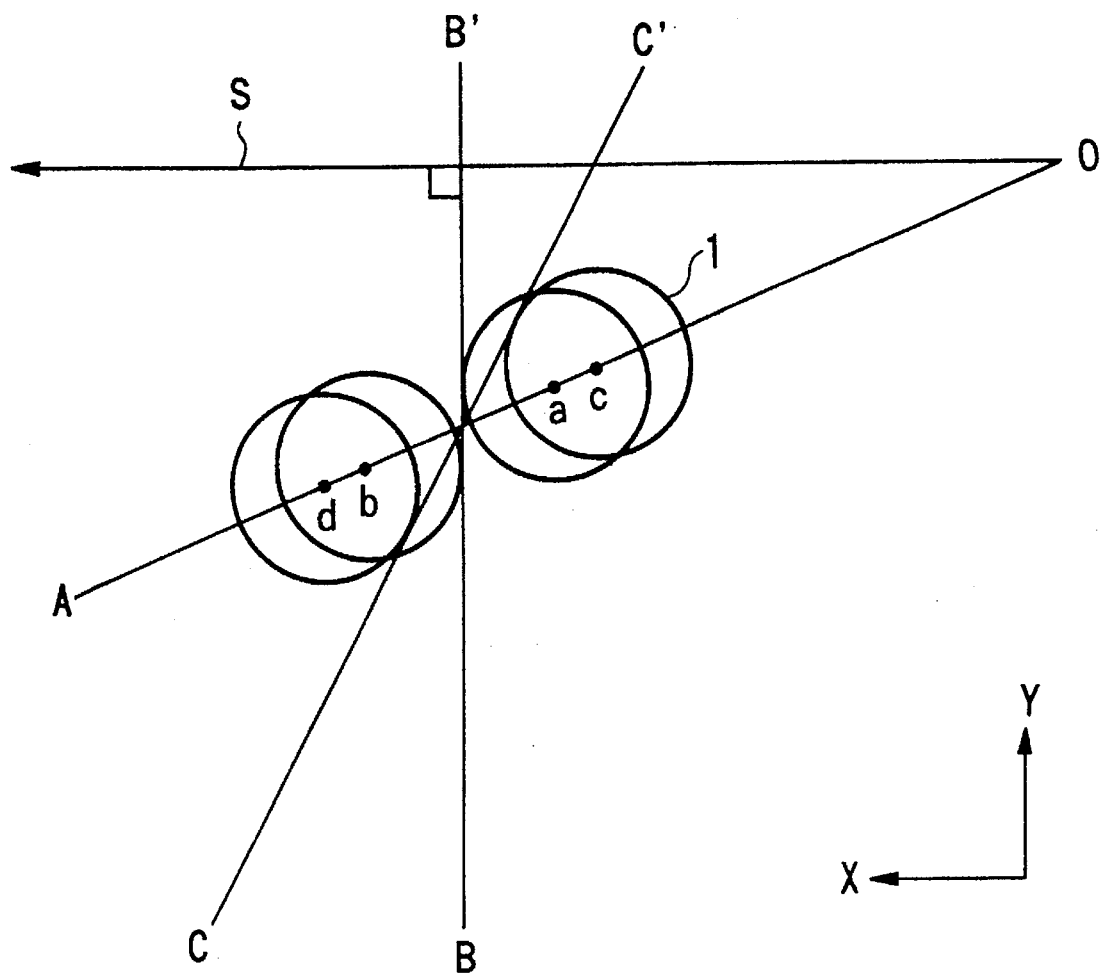

FIG. 17 shows a laser beam of a laser light source according to a second embodiment of the present invention.

A DETAILED DESCRIPTION OF THE PREFERRED EMBODIMENTS

Figure 1:
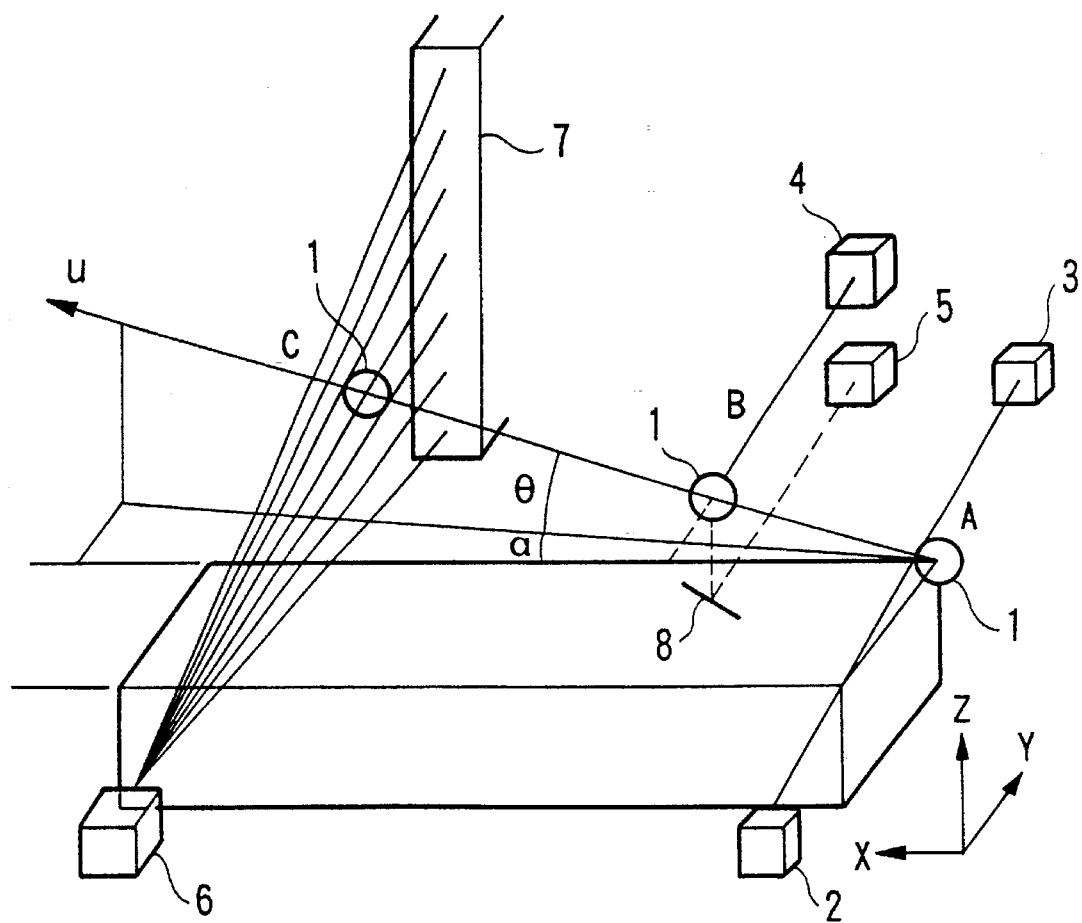
FIG. 1 is a block diagram showing a construction of a flying spherical body measuring apparatus according to a first embodiment of the present invention.
Figure 4:
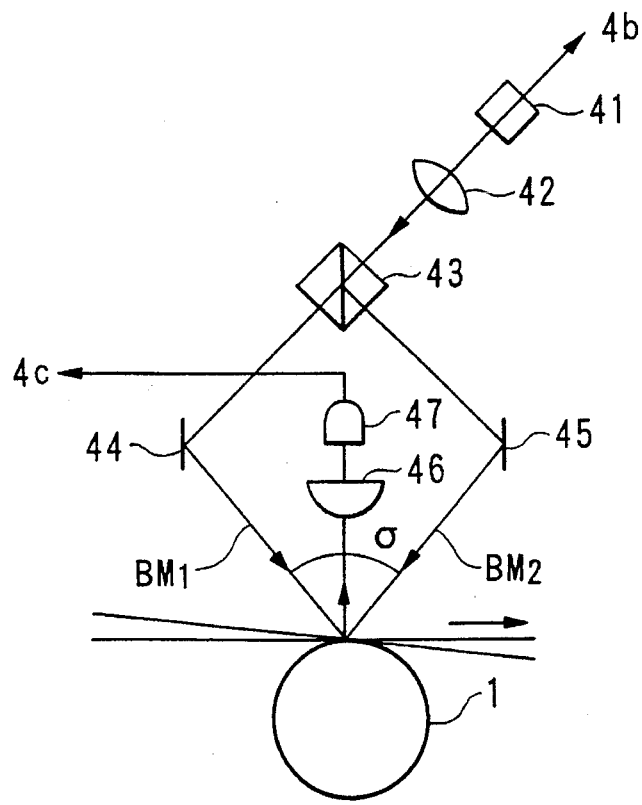
FIG. 4 is a longitudinal cross-section showing the actions of a surface velocity sensor according to a first embodiment of the present invention.

In the following, a first embodiment of the present invention will be explained with reference to the figures. FIG. 1 is a block diagram showing a construction of a flying spherical body measuring apparatus according to a first embodiment of the present invention. In FIG. 1, spherical body 1 moves in the direction indicated by arrow u. Trigger light illuminating portion 2 and trigger light-receiving portion 3, which receives light emitted from trigger light illuminating portion 2 and converts it to an electric signal, are also shown in FIG. 1. Spherical body 1 is arranged in the immediate vicinity of the straight line joining trigger light illuminating portion 2 and trigger light-receiving portion 3. The light emitted from trigger light illuminating portion 2 is arranged in a manner such that it is interrupted without fail by the impacted spherical body 1. Surface velocity sensor 4 irradiates a light beam at the object to be measured. The irradiated light is scattered at the surface of the object. Surface velocity sensor 4 receives a portion of the scattered light and detects the reflected light. Surface velocity sensor 4 then outputs current in response to the detected result. By means of this surface velocity sensor 4, the surface velocity of a side portion of a spherical body 1 flying in the direction indicated by arrow u is measured. Surface velocity sensor 5 is similar to surface velocity sensor 4, and measures the surface velocity of a bottom portion of spherical body 1. Surface velocity sensors 4 and 5 are arranged in a forward direction of motion of spherical body 1 with respect to initial flight point A. FIG. 4 shows a constructional example of these surface velocity sensors 4 and 5. After the light emitted from illuminating device 41 is converted into a parallel ray by collimator lens 42, it is divided into beam BM1 and beam BM2 by means of beam splitter 43. After passing through beam splitter 43, beam BM1 is reflected by total reflective mirror 44, while beam BM2 is reflected by total reflective mirror 45. Beams BM1 and BM2 are designed to intersect at an angle δ in the space through which spherical body 1 will pass. Both beams BM1 and BM2 are then reflected by spherical body 1. The reflected light rays converge at light-receiving device 47 by means of converging lens 46. Light-receiving device 47 outputs an electric signal corresponding to the sum of both reflected light rays of beams BM1 and BM2. The surface velocity of spherical body 1 is then calculated based on this electric signal. This calculation will be explained hereafter.

However, in the case when using the construction shown in FIG. 1 for surface velocity sensor 4, beams BM1 and BM2 are designed to irradiate directly onto a side portion of spherical body 1. In addition, in the case when using this same construction for surface velocity sensor 5, a total reflective mirror 8 is utilized. This total reflective mirror 8 reflects light beams emitted by surface velocity sensor 5, irradiating them onto the lower portion of spherical body 1, and then returns the reflected light rays therein to surface velocity sensor 5. Multi-beam illuminating portion 6 emits a plurality of light beams B1, B2, ..., Bn discretely aligned in a direction vertical to a horizontal plane which will be explained in greater detail hereafter. Speed·angle sensor light-receiving portion 7 receives light beams B1, B2, ..., Bn emitted by multi-beam illuminating portion 6, and converts them into electric signals. Multi-illuminating portion 6 and speed·angle sensor light-receiving portion 7 are also arranged in forward direction of motion of spherical body 1 with respect to the positions of surface velocity sensors 4 and 5.

Figure 2:
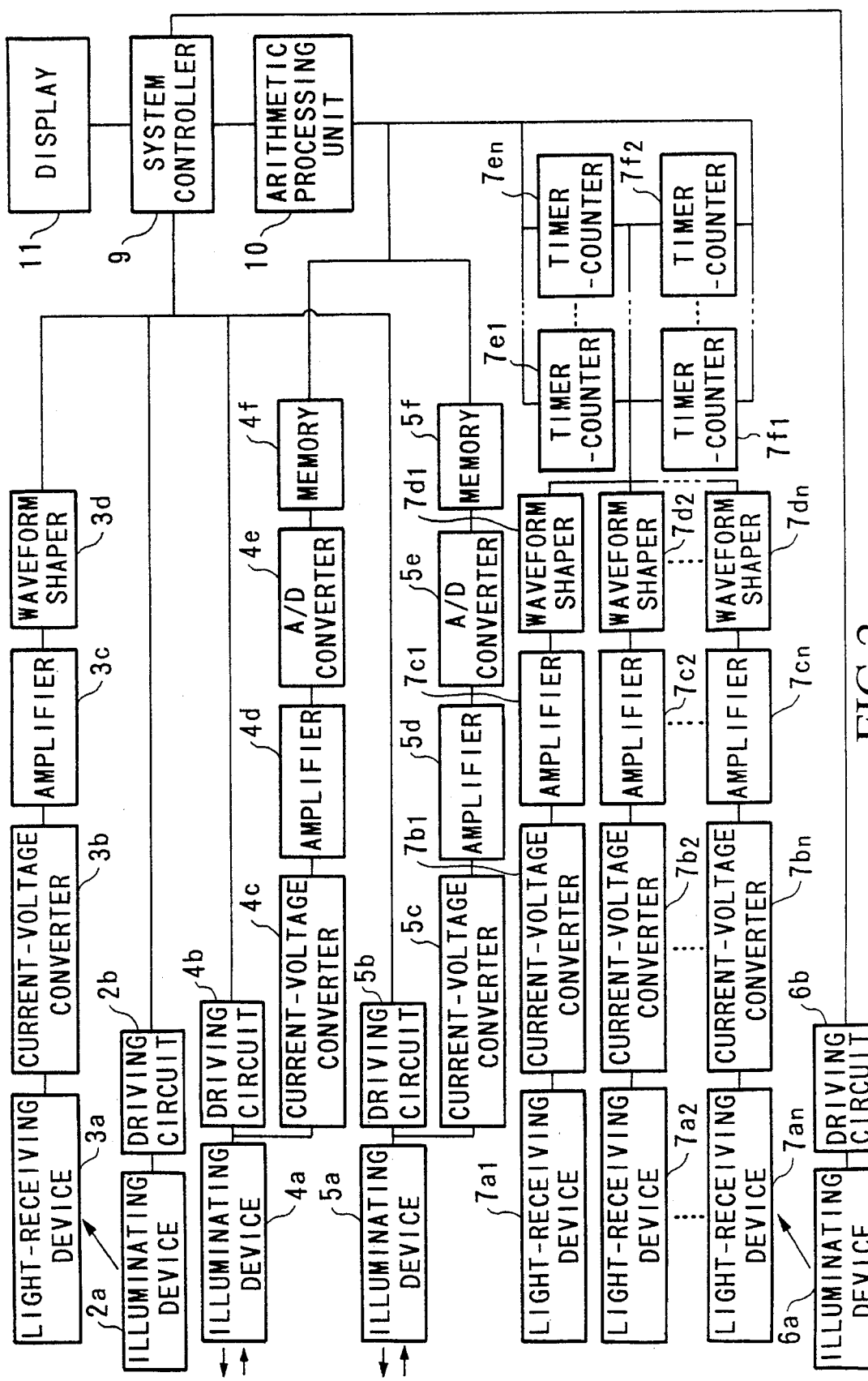
FIG. 2 shows a circuit construction according to a first embodiment of the present invention.

FIG. 2 is a block diagram showing an electrical construction of the above-described trigger light illuminating portion 2, trigger light-receiving portion 3, surface velocity sensor 4, surface velocity sensor 5, multi-beam illuminating portion 6 and velocity·angle sensor light-receiving portion 7.

In FIG. 2, system controller 9 controls the driving of trigger light illuminating portion 2, surface velocity sensor 4, surface velocity sensor 5 and multi-beam illuminating portion 6. Arithmetic processing unit 10 processes the signal obtained from surface velocity sensor 4, surface velocity sensor 5 and velocity·angle sensor light-receiving portion 7. In addition, display portion 11 displays the calculated result of arithmetic processing unit 10.

Trigger light illuminating portion 2 comprises an illuminating device 2a formed from a semiconductor laser, and a driving circuit 2b for driving this illuminating device 2a.

Similarly, multi-beam illuminating portion 6 comprises an illuminating device 6a, and a driving circuit 6b for driving this illuminating device 6a. Driving circuits 2b and 6b illuminate illuminating devices 2a and 6a respectively, according to a control signal frown system controller 9. In addition, surface velocity sensors 4, 5 each comprises an illuminating device 4a, 5a, and a driving circuit 4b, 5b, respectively. Driving circuits 4b, 5b illuminate illuminating devices 4a, 5a, respectively, in accordance with a control signal from system controller 9.

Trigger light-receiving portion 3 is formed from a light-receiving device 3a, current-voltage converter 3b, amplifier 3c and waveform shaper 3d. Light-receiving component 3a receives light emitted from trigger light illuminating device 2. When the light emitted from trigger light illuminating device 2 is interrupted by spherical body 1, the amount of light received by light-receiving device 3a changes, and as a result, the output current of light-receiving device 3a also changes. The voltage waveform corresponding to this change of the output current is then outputted from current-voltage converter 3b. The voltage waveform outputted by current-voltage converter 3b is subsequently amplified by means of amplifier 3c, and then shaped and outputted by means of waveform shaper 3d.

Speed-angle sensor light-receiving portion 7 comprises light-receiving components $7a_k$ (k=1–n) for respectively receiving a plural (n) discrete light beams B1–Bn emitted by multi-beam illuminating portion 6. In addition, with regard to light-receiving device $7a_k$, as in trigger light-receiving portion 3, there are provided current-voltage converter $7b_k$, amplifier $7c_k$ and waveform shaper $7d_k$, in addition to timer counters $7e_k$ and $7f_k$. Timer counters $7e_k$ and $7f_k$ initiate timing by means of a signal obtained from waveform shaper 3d. In addition, timer counters $7e_k$ and $7f_k$ stop timing in accordance with a change in the signal obtained from waveform shaper 3d. In other words, while an incident light beam irradiates onto velocity-angle sensor light-receiving portion 7 from multi-beam illuminating portion 6, the output of the corresponding waveform shaper $7d_k$ reads a logic level of H. On the other hand, this logic level reads L during the interval of intersection of spherical body 1 and a light beam. Among timer counters $7e_k$ and $7f_k$ activated by an output change from trigger light-receiving portion 3, timer counter $7e_k$, which connects to a waveform shaper $7d_k$ in which a change occurred in the logic level from H to L, stops counting. When spherical body 1, continuing in the direction indicated by arrow u, ceases to intersect a light beam it had previously intersected, the logic level of the corresponding waveform shaper $7d_k$ changes from L to H. Timer counter $7f_k$ which connects to this waveform shaper $7d_k$ then stops counting. Timer counters $7e_k$ and $7f_k$, connecting to a waveform shaper $7d_k$ in which a change in the logic level did not occur, can also continue counting to an optionally set value, at which point they stop counting.

Figure 3:
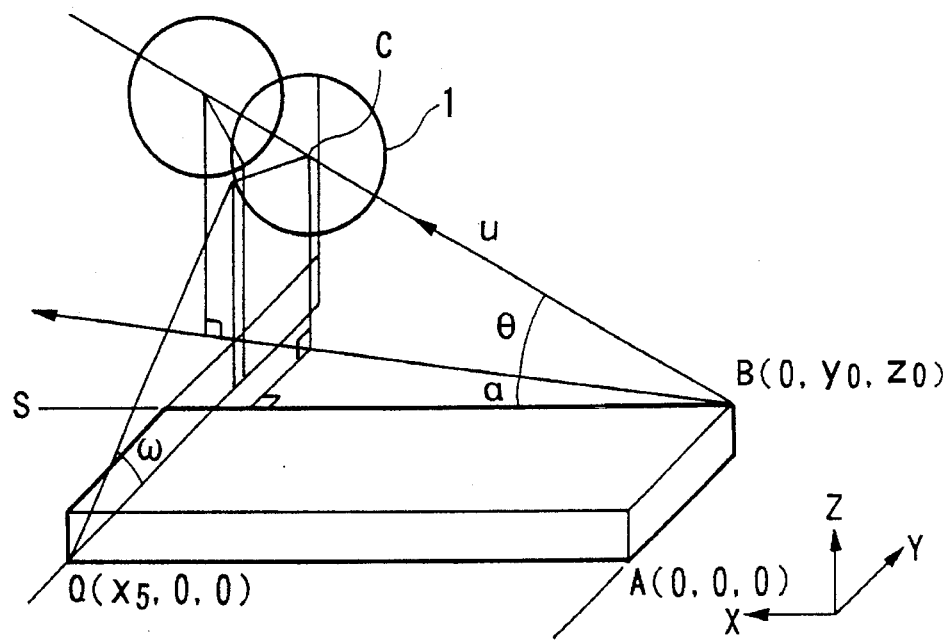
FIG. 3 is a strabismal diagram showing the actions of a flying spherical body measuring apparatus according to a first embodiment of the present invention.

In the following, the action of the flying spherical body measuring apparatus will be explained. As shown in FIG. 3, A (0, 0, 0) represents standard coordinates, B (0, $y_0$, $z_0$) represents the central coordinates of spherical body 1 when placed at a predetermined initial flight point, and Q ($X_5$, 0, 0) represents the illuminating point of multi-beam illuminating portion 6. In addition, V represents the velocity in the direction of flight of spherical body 1, θ represents the initial angle of elevation, α represents the horizontal angle of deviation with respect to standard flight line s, in other words, the initial horizontal angle, and r represents the radius of spherical body 1.

Flight is initiated in the direction indicated by arrow u when spherical body 1, placed at position A, is struck as shown in FIG. 1. At this time, spherical body 1 intersects a light beam emitting from trigger light illuminating portion 2 towards trigger light-receiving portion 3, thereby changing the amount of incident light onto this trigger light-receiving portion 3. As shown in FIG. 2, within trigger light-receiving portion 3, in light-receiving device 3a serving as a photoelectric converter, a change in the amount of light is detected as a change in the current. This change in current is converted to a change in voltage by means of current-voltage converter 3b, and is amplified to an appropriate signal level in amplifier 3c. Furthermore, the signal, after undergoing waveform shaping by means of waveform shaper 3d, is then supplied by system controller 9 to timer counters $7e_k$ (k=1–n) and $7f_k$ (k=1–n) housed inside velocity·angle sensor light-receiving portion 7. Timer counters $7e_k$ (k=1–n) and $7f_k$ (k=1–n) initiate counting upon receiving a signal from waveform shaper 3d.

After crossing the light beam emitted by trigger light-receiving portion 2, spherical body 1 continues its flight and intersects light beams emitted by surface velocity sensors 4 and 5 at position B shown in FIG. 1. At this point, an explanation of the actions of surface velocity sensor 4 will be given with reference to FIG. 4. As seen in FIG. 4, when spherical body 1 passes through the intersection of of beam 1 and beam 2, a reflected light ray from spherical body 1 creates a frequency shift due to the Doppler effect. In FIG. 4, the frequencies $f_1$ and $f_2$ of the reflected light rays of beams 1 and 2 respectively, can be expressed by the following formulae (1) and (2) wherein v represents the surface velocity of spherical body 1 at the intersection of beams 1 and 2, C represents the frequencies of the light rays of beam 1 and beam 2, and λ represents the wavelength of light:

$$f_1 = C - (v/\lambda) \cdot \cos(90 - \delta/2) \tag{1}$$

$$f_2 = C + (v/\lambda) \cdot \cos(90 - \delta/2) \tag{2}$$

Consequently, taking into consideration the reflected light rays, the frequency shift $f_d$ proportional to surface velocity v of spherical body 1 can be expressed by the following formula (3):

$$f_d f_1 - f_2 = -(2v/\lambda) \cdot \sin\delta/2 \tag{3}$$

The light reflected by spherical body 1 is converged using converging lens 46, and then photoelectrically convened in light-receiving device 47. Similarly, in surface velocity sensor 5, a signal is obtained under the same principles as described in the aforementioned.

The output signal current from surface velocity sensors 4 and 5 are converted into voltage signals in current-voltage converters 4c and 5c, and are then amplified to an appropriate voltage in amplifiers 4d and 5d, respectively. A/D converters 4e and 5e then convert the analog signals to digital signals. When receiving a signal from trigger light-receiving portion 3, system controller passes through an appropriate delay interval, and cancels the restrictions in effect on the writing of the outputs of A/D converters 4e and 5e into memories 4f and 5f. When writing into memories 4f and 5f is completed, the system returns to a writing-restriction state.

As shown in FIG. 1, alter passing through position B, spherical body 1 proceeds to position C and intersects at least two light beams from among the plurality of light beams B1, B2, . . . , Bn emitting from multi-beam illuminating portion 6 towards velocity·angle sensor light-receiving portion 7. The pitches of the light beams are less than the radius of spherical body 1. Subsequently, the amount of light received by at least two light-receiving components from among light-receiving components $7a_k$ (k=1–n) change, and these changes are expressed as changes in the currents of the corresponding light-receiving components. As a result, the level of the signals of at least two signals P1, P2, ..., Pn outputted by waveform shaper $7a_k$ (k=1–n) change with respect to time. System controller 9 controls the counter stoppage of the timer counters $7e_k$ and $7f_k$, corresponding to the signal changes, based on these aforementioned signal changes. From the counter values of timer counters $7e_k$ and $7f_k$, the initial and final times at which spherical body 1 intersects any of light beams B1, B2, ..., Bn can be calculated.

When system controller 9 detects the counter termination of timer counters $7e_k$ (k=1–n) and $7f_k$ (k=1–n), it transmits these counter values to arithmetic processing unit 10. Arithmetic processing unit 10 then calculates the velocity V, initial angle of elevation θ and initial horizontal angle α using these aforementioned counter values. This calculation process will be explained in the following.

Time $t_1w$, at which spherical body begins to intersect a light beam, can be expressed by the following formula (4) wherein r represents the radius and V represents the velocity of spherical body 1, t represents the time of intersection of spherical body 1 and a light beam emitting from multi-beam illuminating portion 6, and w represents the angle with the horizontal plane of the light beam.

$$t_1w = \{-B_1 - \sqrt{(B_1^2 - A_1C_1)}\}/VA_1 \tag{4}$$

wherein $A_1=(\cos\theta\cos\alpha)^2 + (\cos\theta\sin\alpha\sin w - \sin\theta\cos w)^2$ $B_1=(\cos\theta\sin\alpha\sin w - \sin\theta\cos w)(y_0\sin w - z_0 \cos w) - x_5 \cos\theta\cos\alpha$ $C_1=x_5^2 + (y_0 \sin w - z_0 \cos w)^2 - r^2$ In addition, time $t_2w$ at which spherical body 1 completes intersecting a light beam, can be expressed by the following formula (5).

$$t_2w = \{-B_1 + \sqrt{(B_1^2 - A_1C_1)}\}/VA_1 \tag{5}$$

Figure 5:
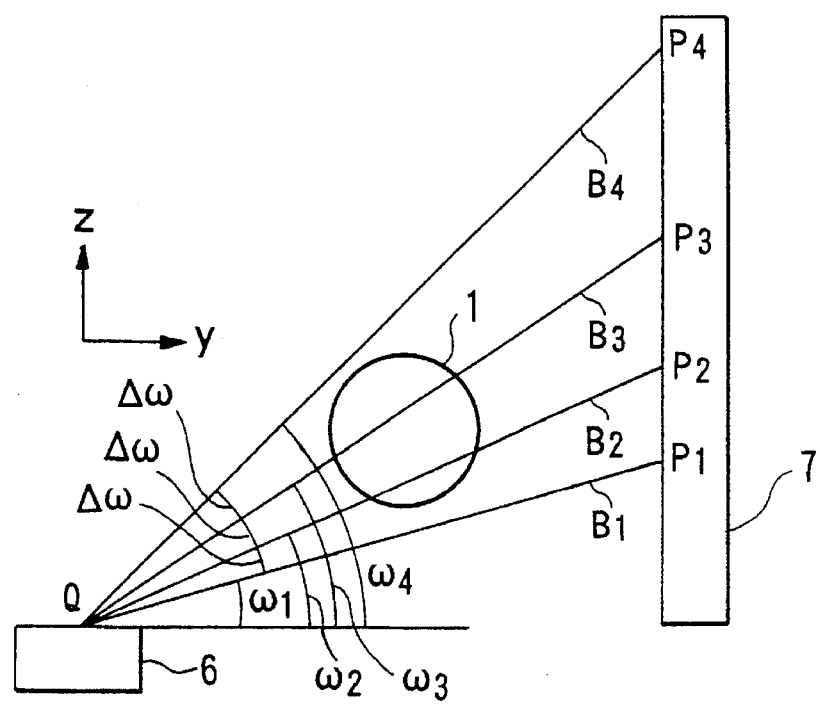
FIG. 5 is a longitudinal cross-section showing the intersection of a flying spherical body and light beams from a multi-beam illuminating portion according to a first embodiment of the present invention.
Figure 6:
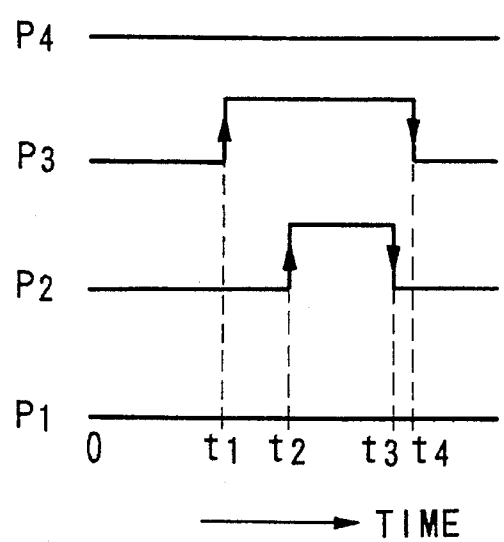
FIG. 6 shows an output signal of a light-receiving portion according to a first embodiment of the present invention.

For example, in FIG. 5, spherical body 1 intersects both light beam B2 and light beam B3. The angle $w_2$ represents the angle of light beam B2 with the horizontal plane, and angle $w_3$ represents the angle of light beam B3 with the horizontal plane. In addition, FIG. 6 shows an example of output signals P1, P2, ... Pn of waveform shaper $7d_k$. Thus, when spherical body 1 intersects and passes through light beams B2 and B3 at the timing shown in FIG. 6, the initial time $t_1w_3$ at which spherical body 1 initially intersects light beam B3, is expressed by the formula (6):

$$t_1w_3 = \{-B_3 - \sqrt{(B_3^2 - A_3C_3)}\}/VA_3; \text{ and} \tag{6}$$

end time $t_2w_3$ for this intersection of spherical body 1 with light beam B3 is expressed by formula (7):

$$t_2w_3 = \{-B_3 + \sqrt{(B_3^2 - A_3C_3)}\}/VA_3 \tag{7}$$

wherein $A_3=(\cos\theta\cos\alpha)^2 + (\cos\theta\sin\alpha\sin w_3 - \sin\theta\cos w_3)^2$ $B_3=(\cos\theta\sin\alpha\sin w_3 - \sin\theta\cos w_3)(y_0 \sin w_3 - z_0 \cos w_3) - x_5 \cos\theta\cos\alpha$ $C_3=x_5^2 + (y_0 \sin w_3 - z_0 \cos w_3)^2 - r^2$ Similarly, the initial time $t_1w_2$ at which spherical body 1 initially intersects light beam B2, is expressed by the formula (8):

$$t_1w_2 = \{-B_2 - \sqrt{(B_2^2 - A_2C_2)}\}/VA_2; \text{ and} \tag{8}$$

end time $t_2w_2$ for this intersection of spherical body 1 with light beam B3 is expressed by formula (9):

$$t_2w_2 = \{-B_2 + \sqrt{(B_2^2 - A_2C_2)}\}/VA_2 \tag{9}$$

wherein $A_2=(\cos\theta\cos\alpha)^2 + (\cos\theta\sin\alpha\sin w_2 - \sin\theta\cos w_2)^2$ $B_2=(\cos\theta\sin\alpha\sin w_2 - \sin\theta\cos w_2)(y_0 \sin w_2 - z_0 \cos w_2) - x_5 \cos\theta\cos\alpha$ $C_2=x_5^2 + (y_0 \sin w_2 - z_0 \cos w_2)^2 - r^2$ The ratio $k_1$ of initial time $t_1w_2$, at which time spherical body 1 initially intersects light beam B2, to initial time $t_1w_3$, at which time spherical body initially intersects light beam B3, is then calculated as shown in formula (10) below.

$$\begin{aligned} k_1 &= t_1w_2/t_1w_3 \\ &= A_3\{-B_2 - \sqrt{(B_2^2 - A_2C_2)}\}/A_2\{-B_3 - \sqrt{(B_3^2 - A_3C_3)}\} \end{aligned} \tag{10}$$

Furthermore, the ratio $k_2$ of end time $t_2w_2$, at which time spherical body 1 ends intersecting light beam B2, to end time $t_2w_3$, at which time spherical body 1 ends intersecting light beam B3, is calculated as shown in formula (11).

$$\begin{aligned} k_2 &= t_2w_2/t_2w_3 \\ &= A_3\{-B_2 + \sqrt{(B_2^2 - A_2C_2)}\}/A_2\{-B_3 + \sqrt{(B_3^2 - A_3C_3)}\} \end{aligned} \tag{11}$$

Subsequently, the ratio K1 of actually measured initial time $T_1w_2$, at which time spherical body 1 initially intersects light beam B2, to actually measured initial time $T_1w_3$, at which time spherical body initially intersects light beam B3, as measured by time counters $7e_k$ and $7f_k$ respectively, is calculated as shown in formula (12) below.

$$K_1=T_1w_2/T_1w_3 \tag{12}$$

Similarly, the ratio $K_2$ of actually measured end time $T_2w_2$, at which time spherical body 1 ends intersecting light beam B2, to actually measured end time $T_2w_3$, at which time spherical body 1 ends intersecting light beam B3, is calculated as shown in formula (13).

$$K_2=T_2w_2/T_2w_3 \tag{13}$$

In formula (14), by substituting formulae (10)–(13) and assuming that $\Delta \cong 0$, each value of θ and α can be calculated.

$$\Delta=(k_1-K_2)^2 + (k_2-K_2)^2 \tag{14}$$

In addition, using formula (6), the velocity V can be calculated from formula (15) below:

$$V = \{-B_3 - \sqrt{(B_3^2 - A_3C_3)}\}/A_3T_1w_3 \tag{15}$$

Figure 7:
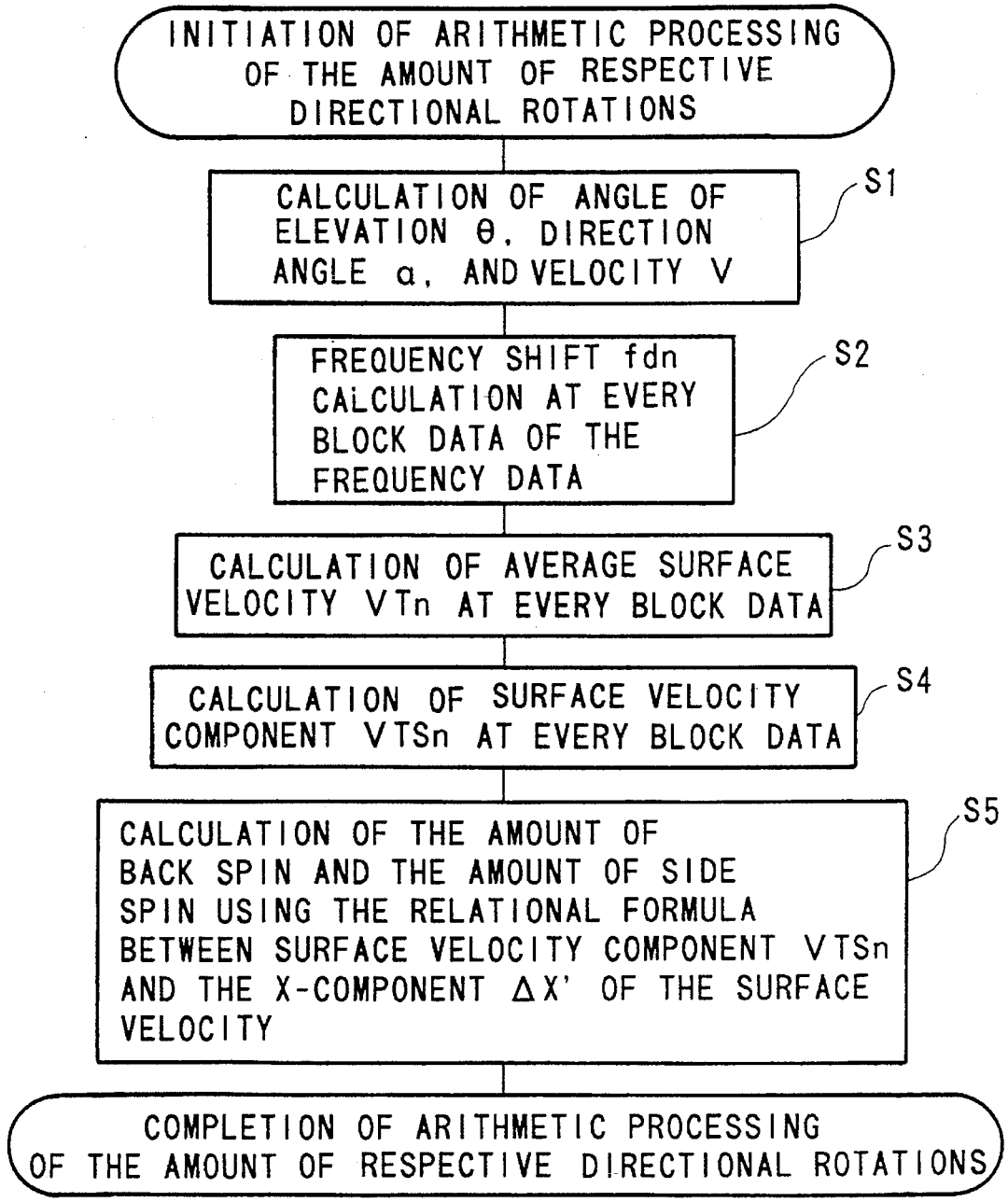
FIG. 7 is a flow chart showing an arithmetic processing of a amount of directional rotation according to a first embodiment of the present invention.

In the following, the arithmetic processing of the amount of back spin and side spin in the rotation of spherical body 1 will be explained with reference to the flow chart shown in FIG. 7. In step S1, the velocity V, angle of elevation θ and horizontal angle α of spherical body 1 are calculated as described above. Subsequently, system controller 9 transmits the data stored inside memory 5f, in other words, the frequency data measured by surface velocity sensors 4 and 5, to arithmetic processing unit 10. In step S2, arithmetic processing unit 10 converts this frequency data to block data of n equivalent portions. In addition, in step S2, Fourier transformation calculation is performed at every block data, and the average frequency of each block data is calculated. As shown in formula (3), the frequency data to be calculated is proportional to the surface velocity of spherical body 1. Consequently, the average surface velocity $V_{Ta}$ of block data a can be calculated using formula (16) below.

$$V_{Ta} = \lambda \cdot f d_a / \{2 \cdot \sin(\delta/2)\} \tag{16}$$

Therefore, the average surface velocities $V_{T1}$–$V_{Tn}$ corresponding to each respective block data are calculated in step S3.

Figure 8:
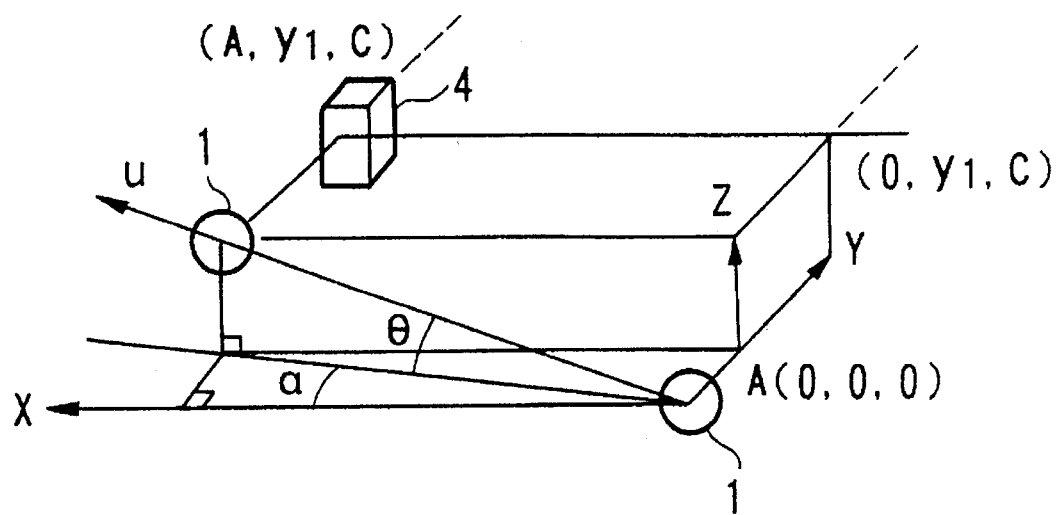
FIG. 8 is a strabismal diagram showing an arithmetic processing of a amount of directional rotation according to a first embodiment of the present invention.

A formula expressing the surface velocity of the x-axis component at a given point generated by the rotation of spherical body 1 will now be calculated. Calculation of only the x-axis component can be performed because only the velocity component parallel to the x-axis is detectable by surface velocity sensor 4. In FIG. 8, spherical body 1 proceeds while rotating from position A in the direction indicated by arrow u, and the light beam from surface velocity sensor 4 irradiates onto point E (x, y, z), shown in FIG. 9. The coordinates of point E can be expressed by formula (17) wherein $\phi$ represents the angle formed by the z-axis and the radius passing through point E, and $\beta$ represents the angle formed with the x-axis.

$$(x, y, z) = (r \sin\phi\cos\beta, r \sin\phi\sin\beta, r \cos\phi) \tag{17}$$

When the z-axis is rotated a radians around the x-axis, the new coordinates (x', y', z') of point E with regard to the x, y and z-axes are provided by the following formulae (18)–(20).

$$x' = x \tag{18}$$

$$y' = y \cos a + z \sin a \tag{19}$$

$$z' = -y \sin a + z \cos a \tag{20}$$

In addition, when the moving spherical body 1 is rotating around the z-axis, using formulae (17)–(20), the x-component $\Delta x'$ due to spin can be expressed using formula (21).

$$\Delta x' = -d\beta/dt \cdot r \sin\phi \sin\beta \tag{21}$$

Formulae (22) and (23), shown below are obtained using formulae (17), (19) and (20).

$$r \sin\phi\sin\beta = y' \cos a - z' \sin a \tag{22}$$

$$\Delta x' = -d\beta/dt(y'\cos a - z'\sin a) \tag{23}$$

In FIG. 8, when defining negative coordinates in the direction indicated by the arrow Y on the y-axis from position A (0, 0, 0), point E normally satisfies the equation y'< 0. Consequently, as seen in formula (24), $$y' = -\sqrt{(r^2 - x'^2 - z'^2)} \tag{24}$$

and using formulae (23) and (24), $\Delta x'$ can be expressed as shown in formula (25) below.

$$\Delta x' = d\beta/dt(z'\sin a + \sqrt{(r^2 - x'^2 - z'^2)} \times \cos a) \tag{25}$$

In addition, $\Delta x'$ can also be expressed in terms of the sizes of the back spin component B and side spin component S, as seen in formula (26).

$$\Delta x' = Bz' + S \times \sqrt{(r^2 - x'^2 - z'^2)} \quad \text{wherein} \tag{26}$$

$$B = d\beta/dt \times \sin a$$
$$S = d\beta/dt \times \cos a$$

In the above mentioned manner, the surface velocity of the x-axis component of point E generated by rotation at point E can be expressed using the back spin, side spin and coordinates of point E.

Figure 9:
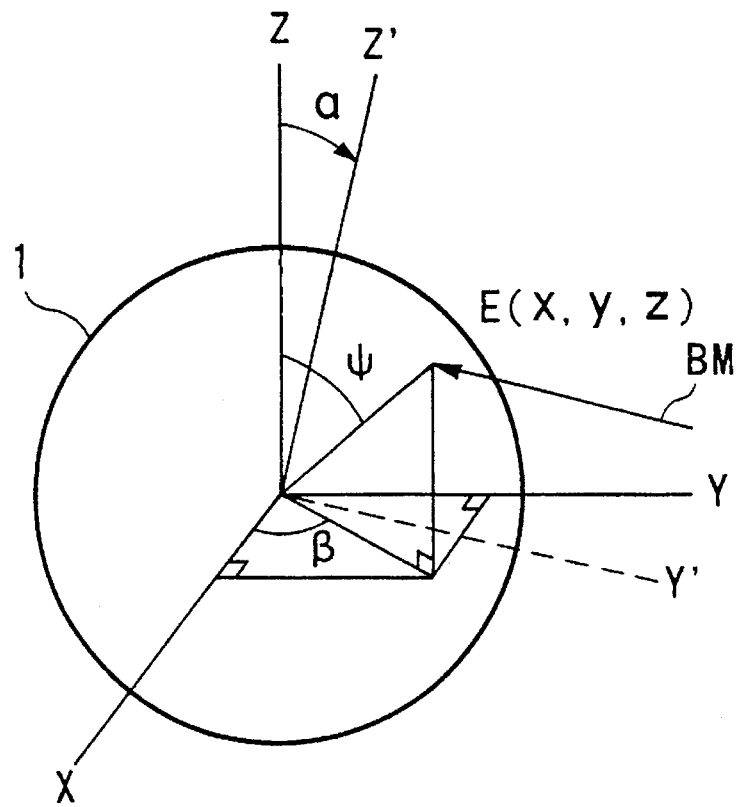
FIG. 9 is a diagram showing an arithmetic processing of a amount of directional rotation based on the surface velocity of a flying spherical body according to a first embodiment of the present invention.

In the following, the amount of back spin and the amount of side spin due to the rotation of spherical body 1 will be calculated. In FIG. 9, the average surface velocity $V_{Tn}$, calculated using surface velocity sensor 4, of block data n to which point E of spherical body 1 belongs is expressed in formula (27) below.

$$V_{Tn} = V \cos\theta\cos\alpha + \Delta x' \tag{27}$$

From formula (27), the surface velocity component $V_{TSn}$ due to rotation can be obtained in formula (28).

$$V_{TSn} = V_{Tn} - V \cos\theta\cos\alpha = \Delta x' \tag{28}$$

Consequently, in step S4, the surface velocity component $V_{TSn}$ is calculated at every block data. In addition, formula (29) is obtained from formula (26) as shown below.

$$\begin{aligned}\Delta x' &= Bz' + S \times \sqrt{(r^2 - x'^2 - z'^2)} \\ &= B \times z' + S \times y'\end{aligned} \tag{29}$$

Given that the center of spherical body 1 lies at (x', y', z')=(0, 0, 0), in step S5, with regard to the relationship between $V_{TSn}$, calculated from the detected result of surface velocity sensor 4, and the x-component $\Delta x'$ of the surface velocity, expressed using the amount of back spin and the amount of side spin of spherical body 1, the sum of the block data can be calculated as shown in formula (30) below.

$$n\Sigma n=1 \Delta^2 = n\Sigma n=1 \{V_{TSn} - (B \cdot z' + S \cdot y')\} \tag{30}$$

Using formula (30), by calculating the back spin B and side spin S in the case when $n\Sigma n=1 \Delta^2$ is at a minima, the real values of the amount of back spin and the amount of side spin can be calculated.

As described in the aforementioned, by means of the signal obtained from surface velocity sensor 4, calculation of both the amount of back spin and the amount of side spin is possible. However, according to the positional conditions with spherical body 1, in contrast to the sharp detection that surface velocity sensor 4 displays with regard to the detection of the amount of side spin, due to a wide range of selectivity, surface velocity 4 often incorporates errors with regard to the amount of back spin. Consequently, in the present invention, as shown in FIG. 1, light from surface velocity sensor 5 irradiates from the lower part to the upper pan of the space through which spherical body 1 will pass. As a result, applying the same principles as that of surface velocity sensor 4, the surface velocity of spherical body 1 can be arithmetically calculated. In other words, the amount of side spin can be measured from the value obtained by means of surface velocity sensor 4, while the amount of back spin can be measured from the value obtained by means of surface velocity sensor 5.

In the aforementioned manner, the following effects are obtainable according to the present embodiment.

(1) A special spherical body provided with a strip or mark is not necessary;
(2) Detection of surface velocity data is continuous, thus resulting in a high accuracy;
(3) Screens and the like are not necessary, thus location is unrestricted;
(4) High speed cameras and the like are not employed, thus keeping costs economically low;
(5) Inputting of information corresponding to the coordinates of the spherical body by hand is not necessary, thus high speed data processing is possible.

Figure 10:
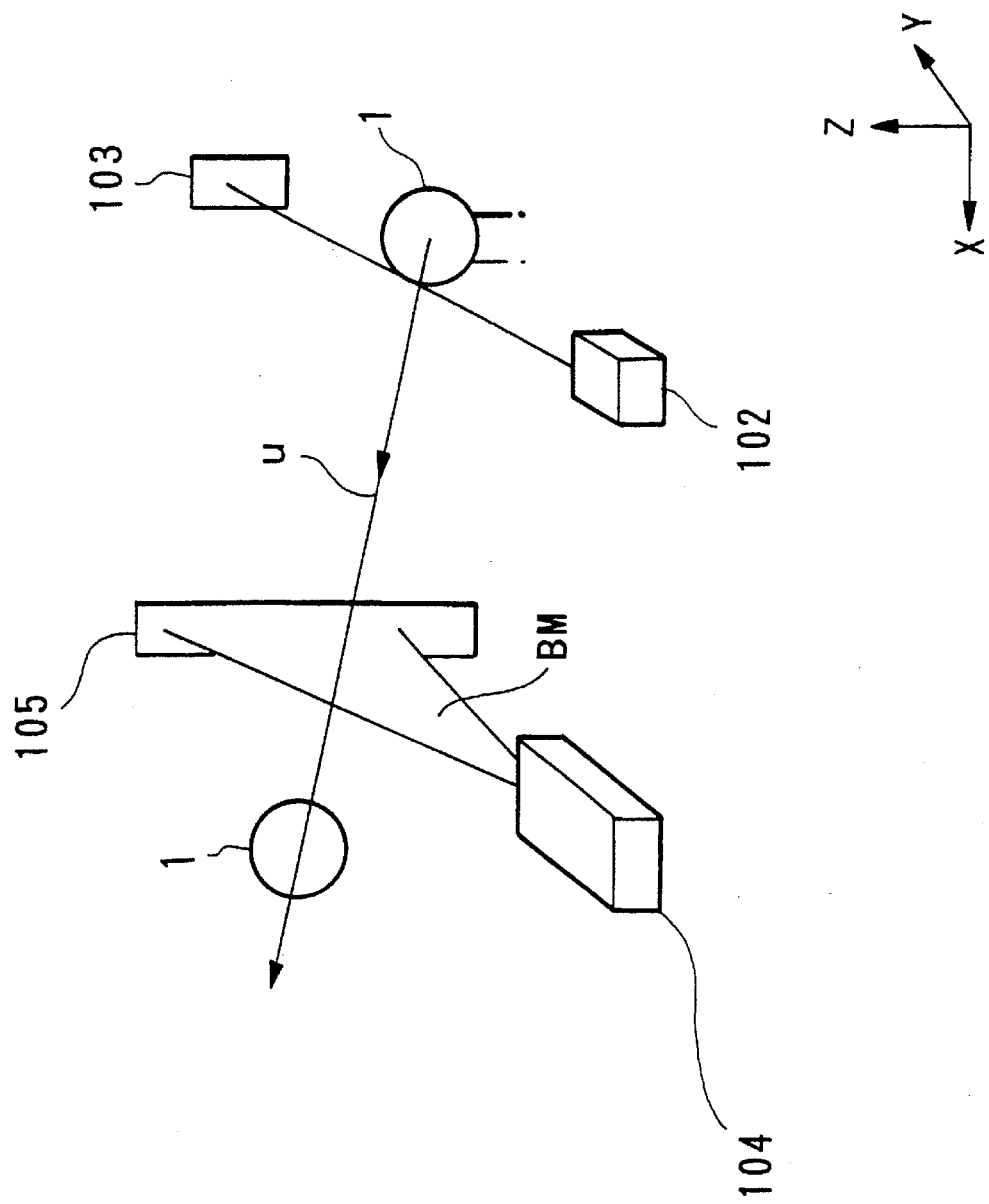
FIG. 10 is an outline showing a flying spherical body measuring apparatus according to a second embodiment of the present invention.

In the following, a second embodiment of the present invention will be described. FIG. 10 is block diagram showing a construction of a flying spherical body measuring apparatus according to a second embodiment of the present invention. In FIG. 10, spherical body 1 moves in a direction indicated by arrow u from an initial flight point. Also provided are a trigger light illuminating portion 102, and a trigger light-receiving portion 103 for receiving the light emitted from trigger light illuminating portion 102 and conveying this light to an electric signal.

Spherical body 1 is arranged in the immediate vicinity of the straight line joining trigger light illuminating portion 102 and trigger light-receiving portion 103. The light emitted from trigger light illuminating portion 102 is arranged in a manner such that it is interrupted without fail by the impacted spherical body 1. Laser light source 104 emits a light beam BM of a fixed width which continuously disperses in a direction perpendicular to the horizontal plane, towards laser light-receiving portion 105. A laser light source 104 is arranged in a forward direction of spherical body 1 with respect to the initial flight point. Laser light-receiving portion 105 lies opposite laser light source 104 in order to receive light beam BM. Laser light-receiving portion 105 shifts to the side of trigger light receiver 103 with respect to the direction of motion of spherical body 1. Consequently, light beam BM obliquely crosses the direction of motion of spherical body 1. Additionally, laser light-receiving portion 105 receives light emitted from laser light source 104 and converts this light into an electric signal. Laser light source 104 and laser light-receiving portion 105 will be explained in greater detail below.

Figure 11B:
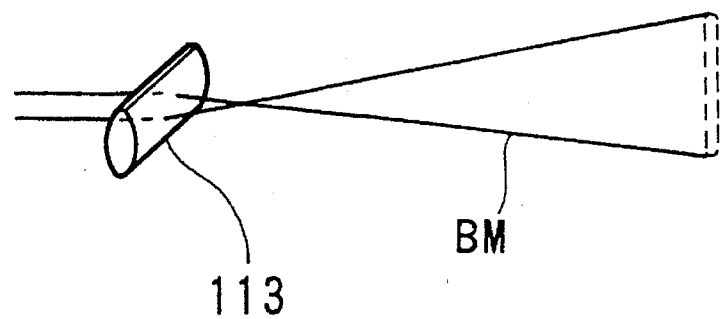

FIG. 11(a) shows a constructional example of the aforementioned laser light source 104. In this figure, there are provided a laser illuminating device 110, and a collimator lens 111 for converting light emitted from illuminating device 41 into parallel rays. Concave lens 112 emits incident light from collimator lens 111 onto the aforementioned laser light-receiving portion 105 as light beam BM which disperses at a fixed width in a vertical direction. In addition, in order to emit this light beam BM, it is also possible to utilize cylindrical lens 113 shown in FIG. 11(b) instead of concave lens 110 shown in FIG. 11(a).

In this manner, the emitted light beam BM is received by laser light-receiving portion 105, as shown in FIG. 12. Laser light-receiving portion 105 continuously receives light beam BM dispersed in a perpendicular direction, and detects the position of the shadow generated onto light-receiving portion 105 when spherical body 1 interrupts light beam BM.

The case in which a Position Sensitive Device (hereafter referred to as "PSD") is used as the light-receiving device in laser light-receiving portion 105 will be explained below. FIG. 15 shows a concrete example of a construction of PSD 115. The PSD 115 shown in this figure outputs the charges, generated at the position of incident light (where light enters the cell), as photoelectric currents $I_1$ and $I_2$ by means of electrodes 116a and 116b which are arranged at both ends of the device. Photoelectric currents $I_1$ and $I_2$ are taken in at magnitudes inversely proportional to the distance from the position of incident light to electrodes 116a and 116b. In addition, a decrease in the amount of incident light from PSD 115 generated when spherical body 1 intersects light beam BM emitted from laser light source 104 results in a decrease in photoelectric currents $I_1$ and $I_2$. At this time, when the shadow generated by the crossing of spherical body 1 reflects onto the light-receiving surface of PSD 115, the output of photoelectric currents $I_1$ and $I_2$ changes according to the position P of the shadow.

FIG. 14 is a block diagram showing the electrical construction of the above-described trigger light-receiving portion 103, laser light-receiving portion 105 and calculation apparatus 23. Trigger light-receiving portion 103 comprises light-receiving device 103a, current-voltage converter 103b, amplifier 103c and waveform shaper 103d. Light-receiving component 103a receives light emitted from trigger light illuminating portion 102 and outputs a current based on the amount of light received. The amount of light received by light-receiving device 103a changes when the light emitted from trigger light illuminating portion 102 is interrupted by spherical body 1, and as a result, the output current also changes. Current-voltage converter 103b converts the output current value of light-receiving device 103a into a voltage signal, and then supplies this signal to amplifier 103c. In addition, amplifier 103c amplifies the output signal of current-voltage converter 103b to a predetermined level, and then supplies this amplified signal to waveform shaper 103d. Waveform shaper 103d performs waveform shaping of the output signal of amplifier 103c, and then outputs this signal as pulse signal S1 to cross starting point counter 12 and cross ending point counter 13, to be explained hereafter.

Laser light-receiving portion 105 comprises PSD 115, current-voltage converters 14, 15, adder 16, subtracter 17, waveform shaper 18, divider 19, A/D converter 20, cross starting point counter 12, cross ending point counter 13, cross starting point angle data memory 21 and cross ending point angle data memory 22. When the light emitted from laser light source 4 is interrupted by spherical body 1, photoelectric currents $I_1$ and $I_2$, outputted from electrodes 116a, 116b of PSD 115, change. Current-voltage converter 14, 15 outputs voltages $V_1$ and $V_2$, corresponding to the changes in the output currents, to adder 16 and subtracter 17. Adder 16 adds voltages $V_1$ and $V_2$, and then outputs their sum result ($V_1 + V_2$). On the other hand, subtracter 17 subtracts voltages $V_1$ and $V_2$, and then outputs this subtraction result ($V_1 - V_2$). Waveform shaper 18 performs waveform shaping of the aforementioned sum ($V_1 + V_2$), and then supplies this as pulse signal S2 to cross starting point counter 12, cross ending point counter 13, cross starting point angle data memory 21 and cross ending point angle data memory 22. Initial crossing point counter 12 and cross ending point counter 13 initiate timing at the aforementioned pulse signal S1, and stop timing based on the negative change of the aforementioned pulse signal S2 obtained from waveform shaper 18. Additionally, divider 19 divides the subtraction result ($V_1 - V_2$) supplied from subtracter 17 by the sum result ($V_1 + V_2$) supplied from adder 16, and then outputs this division result ($V_1 - V_2$)/($V_1 + V_2$). A/D converter 20 converts this division result ($V_1 - V_2$)/($V_1 + V_2$) into a digital signal, and supplies this signal to cross starting point angle data memory 21 and cross ending point angle data memory 22. According to the negative change of the aforementioned pulse signal S2, the aforementioned division result $(V_1-V_2)/(V_1+V_2)$ converted into a digital signal is written into cross starting point angle data memory 21 or cross ending point angle data memory 22.

Calculation device 23 collects the data from each of cross starting point counter 12, cross ending point counter 13, cross starting point angle data memory 21 and cross ending point angle data memory 22, and then calculates the velocity, angle of elevation and horizontal angle of spherical body 1 based on the aforementioned data. At the time of calculation, calculation apparatus 23 hypothesizes a system of intersecting coordinates shown in FIG. 10, and specifies the position of spherical body 1. The y-axis of the aforementioned intersecting coordinates lies within the horizontal plane, conforming to the direction of the light emitted from trigger light illuminating portion 102 to trigger light-receiving portion 103. The x-axis also lies within the horizontal plane and intersects the y-axis, while the z-axis runs perpendicular to the x- and y-axes. The light beam BM emitted from laser light source 104 irradiates parallel to the x–y plane.

In the following, the actions of the flying spherical body measuring apparatus will be explained with reference to FIGS. 15 and 16. As shown in FIG. 15, in the following, A (0, 0, 0) represents the standard coordinates, B (0, $y_0$, $z_0$) represents the central coordinates of spherical body 1 at a predetermined initial flight point, and Q ($x_3$, 0, 0) represents the assumed focus coordinates of laser light source 104. In addition, v is the velocity in the flight direction of spherical body 1, θ is the initial angle of elevation, s is the standard flight line, α is the angle of horizontal deviation or, in other words, the initial horizontal angle, and r is the radius of spherical body 1.

Flight is initiated in the direction indicated by arrow u when spherical body 1, placed at an initial flight point, is struck. At this time, spherical body 1 intersects a light beam emitting from trigger light illuminating portion 102 towards trigger light-receiving portion 103, thereby shifting the amount of incident light onto this trigger light-receiving portion 103. As shown in FIG. 14, within trigger light-receiving portion 103, in light-receiving device 103a serving as a photoelectric converter, a change in the amount of light is detected as a change in the current. This change in current is converted to a change in voltage by means of current-voltage converter 103b, and then amplified to an appropriate signal level in amplifier 103c. Furthermore, the pulse signal S1, after undergoing waveform shaping by means of waveform shaper 103d, is then supplied to cross starting point counter 12 and cross ending point counter 13 housed inside laser light-receiving portion 105. Initial crossing point counter 12 and cross ending point counter 13 initiate counting upon receiving pulse signal S1 from waveform shaper 103d.

After crossing the light beam emitted by trigger light-receiving portion 102, spherical body 1 continues its flight and intersects light beam BM emitted by laser illuminating portion 104 towards laser light-receiving portion 105. At this point, an explanation of the process which occurs in laser light-receiving portion 105 will be given with reference to FIGS. 12, 13 and 14. The amount of light received by PSD 115 changes due to the crossing of spherical body 1 and light beam BM, and this change is expressed as changes in photoelectric currents $I_1$ and $I_2$ outputted from electrodes 116a and 116b respectively. In FIGS. 12 and 13, L is the effective length of PSD 115, in other words, the distance between electrodes 116a and 116b, $x_B$ is the distance between position P of the shadow onto PSD 115 and electrode 116a, and $I_0$ is the total photoelectric current ($I_1+I_2$) from light beam BM emitted from laser light source 104. Consequently, photoelectric currents $I_1$ and $I_2$ can be expressed by the following formulae (31) and (32).

$$I_1=I_0 \cdot \{(L-x_B)/L\} \tag{31}$$

$$I_2=I_0 \cdot (x_B/L) \tag{32}$$

Formula (33) provides the difference between photoelectric currents $I_1$ and $I_2$ using the aforementioned formulae (31) and (32).

$$I_1-I_2=I_0 \cdot \{(L-2x_B)/L\} \tag{33}$$

In addition, formula (34) comes from substituting the equation $I_1+I_2=I_0$, and from formula (35) the position at which spherical body 1 intersects light beam BM can then be calculated.

$$(I_1-I_2)/(I_1+I_2)=(L-2x_B)/L \tag{34}$$

$$x_B=\tfrac{1}{2} \cdot L \cdot \{1-(I_1-I_2)/(I_1+I_2)\} \tag{35}$$

When spherical body 1 starts to intersect light beam BM, thereby interrupting this light beam BM, photoelectric currents $I_1$ and $I_2$ decrease resulting in a corresponding decrease in the output voltages $V_1$ and $V_2$ of current-voltage converters 14 and 15 shown in FIG. 14. The voltage $(V_1+V_2)$ corresponding to the sum of photoelectric currents $I_1$ and $I_2$ $(I_1+I_2)$ is then outputted from adder 16 to waveform shaper 18 and divider 19. As a result, pulse signal S2 of waveform shaper 18 reaches a low level, and the counting of cross starting point counter 12 stops. At this point, the counter value of cross starting point counter 12 corresponds to time interval $t_1$ which measures the time from initial flight of spherical body 1 to the start of intersection with light beam BM. In addition, at the same time, the voltage $(V_1-V_2)$ corresponding to the difference between photoelectric currents $I_1$ and $I_2$ $(I_1-I_2)$ is then outputted from subtracter 17 to divider 19. As a result, the voltage $(V_1-V_2)/(V_1+V_2)$ corresponding to the current $(I_1-I_2)/(I_1+I_2)$ is calculated by divider 19. The result of this calculation is then converted into a digital signal by means of A/D converter 20, and recorded in cross starting point angle data memory 21. The data stored in this cross starting point angle data memory 21 is the division result $(V_1-V_2)/(V_1+V_2)$ at the initial point of intersection between spherical body 1 and light beam BM.

Subsequently, at the end of the intersection of spherical body 1 and light beam BM, the amount of light received by PSD 115 increases resulting in an increase in photoelectric currents $I_1$ and $I_2$ outputted from electrodes 116a and 116b respectively. The pulse signal S2 of waveform shaper 18 accordingly reaches a high level, and when this signal reaches its maximum value, the counting of cross ending point counter 13 stops. At this point, the counter value of cross ending point counter 13 corresponds to time interval $t_2$ which measures the time from initial flight of spherical body 1 to the end of intersection with light beam BM. In addition, at the same time, in a manner similar to the processes described above, calculations are performed by subtracter 17 and divider 19, and the result of these calculations is then converted into a digital signal by means of A/D converter 20, and recorded in cross ending point angle data memory 22. The data stored in this cross ending point angle data memory 22 is the division result $(V_1-V_2)/(V_1+V_2)$ at the ending point of intersection between spherical body 1 and light beam BM.

Calculation apparatus 23 takes in the data from cross starting point angle data memory 21, and calculates data $x_{B1}$ indicating the position of the shadow on PSD 115, as shown in formula (36).

$$x_{B1} = \tfrac{1}{2} \cdot L \cdot \{1 - (V_1 - V_2)/(V_1 + V_2)\} \qquad (36)$$

In addition, calculation apparatus 23 takes in the data from cross ending point angle data memory 22, and calculates data $x_{B2}$ indicating the position of the shadow on PSD 115, as shown in formula (37) below.

$$x_{B2} = \tfrac{1}{2} \cdot L \cdot \{1 - (V_1 - V_2)/(V_1 + V_2)\} \qquad (37)$$

In FIG. 12, the sensor angle $w_1$ at the cross starting point of spherical body 1 and light beam BM can be calculated from formula (38) below wherein m is the distance from the intersection of line v, extending from the assumed focus coordinates Q of laser light source 104 along the y-axis, and line w, extending along the z-axis on the light-receiving surface of PSD 115, to the assumed focus coordinates Q, and n is the distance from the horizontal plane to the lowest end of PSD 115.

$$w_1 = \tan^{-1}(n + x_{B1})/m \qquad (38)$$

At the same time, the sensor angle $w_2$ at the cross ending point of spherical body 1 and light beam BM can be calculated using formula (39) below.

$$w_2 = \tan^{-1}(n + x_{B2})/m \qquad (39)$$

In FIGS. 15 and 16, at the cross starting time of spherical body 1 and light beam BM, in other words after time interval $t_1$, the following formulae (40)–(46) are obtained wherein C ($x_1$, $y_1$, $z_1$) represents the central coordinates of spherical body 1, D ($x_4$, $y_4$, $z_1$) represents the coordinates of the intersection with light beam BM, and $\delta$ represents the angle formed between light beam BM and x-axis.

$$x_1 = vt_1 \cos\theta \cos\alpha \qquad (40)$$

$$y_1 = vt_1 \cos\theta \sin\alpha + y_0 \qquad (41)$$

$$z_1 = vt_1 \sin\theta + z_0 \qquad (42)$$

$$x_4 - r\cos(90 - \delta) = x_1 \qquad (43)$$

$$y_4 - r\sin(90 - \delta) = y_1 \qquad (44)$$

$$y_4/(x_3 - x_4) = \tan\delta \qquad (45)$$

$$z_1/\sqrt{(x_3 - x_4)^2 + y_4^2} = \tan w_1 \qquad (46)$$

In addition, at the cross ending time of spherical body 1 and light beam BM, in other words after time interval $t_2$, the following formulae (47)–(53) are obtained wherein E ($x_5$, $y_5$, $z_5$) represents the central coordinates of spherical body 1, and F ($x_6$, $y_6$, $z_5$) represents the coordinates of the intersection with light beam BM.

$$x_5 = vt_2 \cos\theta \cos\alpha \qquad (47)$$

$$y_5 = vt_2 \cos\theta \sin\alpha + y_0 \qquad (48)$$

$$z_5 = vt_2 \sin\theta + z_0 \qquad (49)$$

$$x_5 = r\cos(90 - \delta) = x_6 \qquad (50)$$

$$y_5 - r\sin(90 - \delta) = y_6 \qquad (51)$$

$$y_6/(x_3 - x_6) = \tan\delta \qquad (52)$$

$$z_5/\sqrt{(x_3 - x_6)^2 + y_6^2} = \tan w_2 \qquad (53)$$

Using formulae (40) and (43), the following formulae (54) and (55) are obtained.

$$x_4 - r\cos(90 - \delta) = vt_1 \cos\theta \cos\alpha \qquad (54)$$

$$x_4 = vt_1 \cos\theta \cos\alpha + r\cos(90 - \delta) \qquad (55)$$

In addition, from formulae (45) and (46), the following formulae (56) and (57) are obtained.

$$y_4 = (x_3 - x_4)\tan\delta \qquad (56)$$

$$z_1 = \sqrt{(x_3 - x_4)^2 + y_4^2} = \tan w_1 \qquad (57)$$

Subsequently, formula (58) is derived using these aforementioned formulae (56) and (57) as shown below.

$$\begin{aligned} z_1 &= \sqrt{(x_3 - x_4)^2 + (x_3 - x_4)^2 \times \tan\delta} \times \tan w_1 \\ &= (x_3 - x_4)\sqrt{(1 + \tan\delta)} \times \tan w_1 \end{aligned} \qquad (58)$$

Additionally, formula (59) is derived using formulae (42) and (58) as shown below.

$$vt_1 \sin\theta + z_0 = \qquad (59)$$
$$x_3 \times \sqrt{(1 + \tan^2\delta)} \times \tan w_1 - x_4 \times \sqrt{(1 + \tan^2\delta)} \times \tan w_1$$

Furthermore, formula (60) below is obtained by substituting formula (55) into (59), $$vt_1 \sin\theta + z_0 = \qquad (60)$$
$$x_3 \times \sqrt{(1 + \tan^2\delta)} \times \tan w_1 - \sqrt{(1 + \tan^2\delta)} \times$$
$$\tan w_1 \{vt_1 \cos\theta \cos\alpha + r\cos(90 - \delta)\}$$

and formulae (61) and (62) are derived from the above formula (60).

$$vt_1 \sin\theta + \sqrt{(1 + \tan^2\delta)} \times \qquad (61)$$
$$\tan w_1 \times vt_1 \cos\theta \cos\alpha = x_3 \times \sqrt{(1 + \tan^2\delta)} \times \tan w_1 -$$
$$\sqrt{(1 + \tan^2\delta)} \times \tan w_1 \times r\cos(90 - \delta) - z_0$$

$$vt_1 \sin\theta + \sqrt{(1 + \tan^2\delta)} \times \tan w_1 \times vt_1 \cos\theta \cos\alpha = k_1 \qquad (62)$$

On the other hand, from formulae (47) and (50), formula (63) is obtained.

$$vt_1 \cos\theta \cos\alpha + r\cos(90 - \delta) = x_6 \qquad (63)$$

Additionally, formulae (64) and (65) are obtained by applying formulae (52) and (53) as shown below.

$$y_6 = (x_3 - x_6) \cdot \tan\delta \qquad (64)$$

$$z_5 = \sqrt{\{(x_3-x_6)^2+y_6^2\}} \times \tan w_2 \quad (65)$$
$$= (x_3-x_6) \times \sqrt{(1+\tan^2\delta)} \times \tan w_2$$

Formula (66) is then obtained by substituting formula (49).

$$vt_2\sin\theta + z_0 = (x_3-x_6) \times \sqrt{(1+\tan^2\delta)} \times \tan w_2 \quad (66)$$

Furthermore, by substituting formula (63), the following formula (67) is obtained.

$$vt_2\sin\theta + z_0 = x_3 \times \sqrt{(1+\tan^2\delta)} \times \tan w_2 - \{vt_2\cos\theta\cos\alpha - r\cos(90-\delta)\} \times \sqrt{(1+\tan^2\delta)} \times \tan w_2 \quad (67)$$

Formulae (58) and (59) are produced by further calculation as shown below.

$$vt_2\sin\theta + \sqrt{(1+\tan^2\delta)} \times \tan w_2 \times vt_2\cos\theta\cos\alpha = \quad (68)$$
$$x_3 \times \sqrt{(1+\tan^2\delta)} \times \tan w_2 + r \times \sqrt{(1+\tan^2\delta)} \times \tan w_2 \times \cos(90-\delta)$$

$$vt_2\sin\theta + \sqrt{(1+\tan^2\delta)} \times \tan w_2 \times vt_2\cos\theta\cos\alpha = k_2 \quad (69)$$

Subtracting formula (69) from (62) produces the following set of calculations shown in formulae (70), (71) and (72).

$$\sqrt{(1+\tan^2\delta)} \times v\cos\theta\cos\alpha (\tan w_1 - \tan w_2) = k_1/t_1 - k_2/t_2 \quad (70)$$

$$v\cos\theta\cos\alpha = \quad (71)$$
$$1/\{\sqrt{(1+\tan^2\delta)\times(\tan w_1 - \tan w_2)}\} \times (k_1/t_1 - k_2/t_2)$$

$$v\cos\theta\cos\alpha = k_3 \quad (72)$$

Subsequently, formula (73) is obtained from formulae (71) and (44) as shown below.

$$y_4 - r\sin(90-\delta) = vt_1\cos\theta\sin\alpha + y_0 \quad (73)$$

In addition, formula (74) is derived from formulae (45) and (46), $$x_3 - x_4 = y_4/\tan\delta \quad (74)$$

and subsequently, formulae (75), (76), (77) and (78) are obtained by initially substituting formula (74) for (46) and then calculating as shown below.

$$z_1 = y_4 \times \sqrt{(1+1/\tan^2\delta)} \times \tan w_1 = vt_1\sin\theta + z_0 \quad (75)$$

$$\{vt_1\cos\theta\sin\alpha + y_0 + r\sin(90-\delta)\} \cdot \quad (76)$$
$$\sqrt{(1+1/\tan^2\delta)} \times \tan w_1 = vt_1\sin\theta + z_0$$

$$\sqrt{(1+1/\tan^2\delta)} \times \tan w_1 \times vt_1\cos\theta\sin\alpha - vt_1\sin\theta = \quad (77)$$
$$z_0 - (y_0 + r\sin(90-\delta)) \times \sqrt{(1+1/\tan^2\delta)} \times \tan w_1$$

$$\sqrt{(1+1/\tan^2\delta)} \times \tan w_1 \times v\cos\theta\sin\alpha - v\sin\theta = \quad (78)$$
$$[z_0 - \{y_0 + r\sin(90-\delta)\} \times \sqrt{(1+1/\tan^2\delta)} \times \tan w_1]/t_1 = k_4$$

In the following, formulae (79) and (80) are obtained from formulae (48) and (51), and formulae (52) and (53) respectively.

$$vt_2\cos\theta\sin\alpha + y_0 - r\sin(90-\delta) = y_6 \quad (79)$$

$$z_5 = y_6 \times \sqrt{(1+1/\tan^2\delta)} \times \tan w_2 \quad (80)$$

Furthermore, formulae (81) is obtained from formulae (79), (80) and (49), and formula (82) is set thereafter.

$$vt_2\sin\theta + z_0 = \quad (81)$$
$$\{vt_2\cos\theta\sin\alpha + y_0 - r\sin(90-\delta)\} \times \sqrt{(1+1/\tan^2\delta)} \times \tan w_2$$

$$\sqrt{(1+1/\tan^2\delta)} \times \tan w_2 \times v\cos\theta\sin\alpha + v\sin\theta = \quad (82)?$$
$$[z_0 - \{y_0 + r\sin(90-\delta)\} \times \sqrt{(1+1/\tan^2\delta)} \times \tan w_2]/t_2 = k_5$$

In addition, subtracting formula (82) from (78) produces formulae (83) and (84) as shown below.

$$\sqrt{(1+1/\tan^2\delta)} \times v\cos\theta\sin\alpha (\tan w_1 - \tan w_2) = k_4 - k_5 \quad (83)$$

$$v\cos\theta\sin\alpha = \quad (84)$$
$$(k_4 - k_5)/\{\sqrt{(1+1/\tan^2\delta)\times(\tan w_1 - \tan w_2)}\} = k_6$$

Dividing formula (84) by (72) produces formula (85), $$\tan\alpha = k_6/k_3 \quad (85)$$

and the horizontal angle $\alpha$ can then be obtained by formula (86) below.

$$\alpha = \tan^{-1}(k_6/k_3) \quad (86)$$

Formula (87) is obtained from formula (62), and subsequent formulae (88) and (89) am obtained by substituting in formula (72) as shown below.

$$v\sin\theta + \sqrt{(1+\tan^2\delta)} \times \tan w_1 \times v\cos\theta\cos\alpha = k_1/t_1 \quad (87)$$

$$v\sin\theta + k_3 \times \sqrt{(1+\tan^2\delta)} \times \tan w_1 = k_1/t_1 \quad (88)$$

$$v\sin\theta = k_1/t_1 - k_3 \times \sqrt{(1+\tan^2\delta)} \times \tan w_1 \quad (89)$$

Introducing $k_7$ and $k_8$ produces formulae (90) and (91) as shown below.

$$v\sin\theta = k_7 \quad (90)$$

$$v\cos\theta = k_3/\cos\{\tan^{-1}(k_6/k_3)\} = k_8 \quad (91)$$

Formula (92) is derived from formulae (72) and (86), $$\tan\theta = k_7/k_8 \quad (92)$$

and angle of elevation θ can then be calculated using formula (93) below.

$$\theta = \tan^{-1}(k_7/k_8) \qquad (93)$$

In addition, by dividing (90) by (91), the speed v of spherical body 1 can be calculated as shown below in formula (94).

$$v = k_7 \div \sin\{\tan^{-1}(k_7/k_8)\} \qquad (94)$$

In the following, the principle behind the fixed inclination of light beam BM with regard to the surface of intersection with the linear path of spherical body 1, will be explained with reference to FIG. 17. In this figure, arrow S indicates the linear path of spherical body 1, and spherical body 1 flies along line O–A. Light beam BM intersects arrow S, and passes along the line B—B' lying parallel to the y-axis. The distances Oa and Ob are then obtained by the following equations wherein a is the center of spherical body 1 at time $t_{1B}$ representing the initial crossing time of spherical body 1 and light beam BM, and b is the center of spherical body 1 at time $t_{2B}$ representing the cross ending time.

$$Oa = vt_{1B}$$

$$Ob = vt_{2B}$$

Subsequently, light beam BM passes along the line C—C' having a fixed inclination with regard to line B—B'. The distances Oc and Od are then obtained by the following equations wherein c is the center of spherical body 1 at time $t_{1C}$ representing the cross starting time of spherical body 1 and light beam BM, and d is the center of spherical body 1 at time $t_{2C}$ representing the cross ending time.

$$Oc = vt_{1C}$$

$$Od = vt_{2C}$$

As shown in FIG. 17, since Oc<Oa, then $$t_{1C} < t_{1B}$$

and since Ob< Od, the following is similarly obtained.

$$t_{2B} < t_{2C}$$

Consequently, the aforementioned calculations produce the following.

$$t_{2B} - t_{1B} < t_{2C} - t_{1C}$$

Irradiating light beam BM at a fixed inclination with regard to a surface parallel to the y-axis creates a wider interval between the cross starting time and the cross ending time with spherical body 1 than irradiating light beam BM in a direction parallel to the y-axis, and thus, as a result, the time resolution is improved.

In the aforementioned manner, according to a second embodiment of the present invention, as a result of there being only one solution to the equations with regard to the calculations of the calculation apparatus, the arithmetic processing time is short, and errors are rare. In addition, because there exists only one illuminating source, installation is simple, and thus few factors contribute towards errors in measuring the beam diameter. Furthermore, since light beam BM is irradiated at a fixed inclination with regard to the surface of intersection with the linear path of spherical body 1, the time resolution is improved, and a high measuring accuracy is obtained.

Although the invention has been described with reference to specific embodiments, this description is not meant to be construed in a limiting sense. Various modifications of the disclosed embodiments, as well as other embodiments of the invention, will become apparent to persons skilled in the art upon reference to the description of the invention. It is therefore contemplated that the appended claims will cover any such modification or embodiments as fall within the true scope of the invention.

What is claimed is:

1. A flying spherical body measuring apparatus comprising:

a detecting means for detecting the start of motion of a flying spherical body from a predetermined initial flight point;

a surface velocity sensor, arranged in a forward direction of said flying spherical body, with respect to said initial flight point, for optically measuring a surface velocity of said flying spherical body;

a multi-beam illuminating portion for emitting a plurality of light beams along a plane in a manner such that at least two of said plurality of light beams intersect said flying spherical body while in flight, said multi-beam illuminating portion being arranged in a forward direction of said flying spherical body with respect to said surface velocity sensor;

a multi-beam light receiving portion for receiving respectively a plurality of light beams emitted from said multi-beam illuminating portion; and an arithmetic processing means for timing periods from the start of motion of the spherical body to intersections of the spherical body with at least two of said plurality of light beams and for calculating amounts of rotation of said flying spherical body with respect to predetermined directions based on the surface velocity measured by said surface velocity sensor, and amounts of an angle of elevation, a horizontal angle and velocity of said flying spherical body based on said periods;

said surface velocity sensor comprising:

a side portion surface velocity sensor for detecting the surface velocity of a side portion of said flying spherical body by means of emitting a light beam at said side portion of said flying spherical body and then detecting the reflected light of said light beam; and a lower portion surface velocity sensor for detecting the surface velocity of a lower portion of said flying spherical body by means of emitting a light beam at said lower portion of said flying spherical body and then detecting the reflected light of said light beam.

2. A flying spherical body measuring apparatus according to claim 1, wherein said side portion surface velocity sensor and said lower portion surface velocity sensor each respectively comprises;

an illuminating device;

a collimator lens for converting light emitted from said illuminating device into parallel rays;

a splitter for dividing said parallel rays passing through said collimator lens into two light beams diverging at a predetermined angle;

a total reflective mirror for totally reflecting said two light beams, and for intersecting said two light beams at a predetermined angle in a space through which said flying spherical body will pass;

a converging lens for converging the reflected light of said two light beams reflected by said flying spherical body; and a light-receiving device for converting said reflected light converged by means of said converging lens into an electric signal.

3. A flying spherical body measuring process comprising the steps of:

calculating a velocity, angle of elevation and horizontal angle of a flying spherical body;

converting frequency data detected by means of a surface velocity sensor into block data of n equivalent portions, performing Fourier transformation calculation at every block data, and calculating an average frequency of each block data;

calculating an average surface velocity at every block data based on said average frequency of each block data;

calculating a surface velocity component at every block data based on said average surface velocity; and calculating the amount of directional rotation of said flying spherical body based on the relationship between said surface velocity component, and a flight directional component, of surface velocity expressed by means of the rotational amount of said flying spherical body.

* * * * *